(12) United States Patent
Nagata et al.

(10) Patent No.: US 9,260,077 B2
(45) Date of Patent: Feb. 16, 2016

(54) PRETENSIONER

(75) Inventors: Tomonori Nagata, Aichi-ken (JP); Shinichi Okubo, Aichi-ken (JP); Masaru Ukita, Aichi-ken (JP); Katsuki Asagiri, Aichi-ken (JP); Yasutaka Watanabe, Aichi-ken (JP); Keiichi Kato, Aichi-ken (JP); Yusuke Hirokawa, Aichi-ken (JP); Hiroaki Yamazoe, Aichi-ken (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 1093 days.

(21) Appl. No.: 13/329,921

(22) Filed: Dec. 19, 2011

(65) Prior Publication Data

US 2012/0160947 A1 Jun. 28, 2012

(30) Foreign Application Priority Data

Dec. 22, 2010 (JP) .................................. 2010-285911
Aug. 11, 2011 (JP) .................................. 2011-176102

(51) Int. Cl.
*B60R 22/46* (2006.01)

(52) U.S. Cl.
CPC ..... *B60R 22/4628* (2013.01); *B60R 2022/4638* (2013.01)

(58) Field of Classification Search
USPC ........................... 242/374, 384, 390.5, 390.6; 280/805–807; 297/476–480; 60/632, 60/637
See application file for complete search history.

(56) References Cited

U.S. PATENT DOCUMENTS

| 5,450,723 | A | * | 9/1995 | Fohl | ..................... | B60R 22/4619 280/806 |
| 5,842,344 | A | * | 12/1998 | Schmid | ............... | B60R 22/4633 242/374 |
| 5,956,954 | A | * | 9/1999 | Schmid | ............... | B60R 22/4633 60/636 |
| 6,227,478 | B1 | | 5/2001 | Hudelmaier et al. | | |
| 6,343,758 | B1 | | 2/2002 | Abe et al. | | |

(Continued)

FOREIGN PATENT DOCUMENTS

| DE | 201 13 773 U1 | 5/2002 |
| DE | 103 34 333 A1 | 4/2004 |

(Continued)

*Primary Examiner* — Emmanuel M Marcelo
*Assistant Examiner* — Angela Caligiuri
(74) *Attorney, Agent, or Firm* — Roberts Mlotkowski Safran & Cole, PC

(57) ABSTRACT

A pretensioner comprising a gas generating unit; a pretensioner body to whose inside the gas is supplied; a spool driving member disposed inside the pretensioner body and causing a spool to rotate to retract webbing onto the spool; a gas flow rate adjusting portion disposed in the spool driving member and whose inner peripheral shape is set in accordance with a flow rate of the gas to be passed through the gas flow rate adjusting portion; and a filter unit having a vent portion that is communicated with a space between the gas generating unit and the spool driving member and is also communicated with the gas flow rate adjusting portion. The open shape of the gas flow rate adjusting portion has a portion that does not coincide in a plan view with the open shape of the vent portion, and the overall open area of the vent portion is set larger than the open area of the gas flow rate adjusting portion.

11 Claims, 30 Drawing Sheets

(56) References Cited

U.S. PATENT DOCUMENTS

| | | | |
|---|---|---|---|
| 6,454,306 B1 | 9/2002 | Cunningham et al. | |
| 6,575,498 B2 * | 6/2003 | Nagata | B60R 22/4633 |
| | | | 242/374 |
| 6,698,677 B1 * | 3/2004 | Happ | B60R 22/4633 |
| | | | 242/374 |
| 7,178,831 B2 | 2/2007 | Yoshida et al. | |
| 7,500,632 B2 | 3/2009 | Ono et al. | |
| 7,624,940 B2 * | 12/2009 | Kitazawa | B60R 22/4633 |
| | | | 242/374 |
| 8,783,724 B2 * | 7/2014 | Yang | B60R 22/4633 |
| | | | 280/806 |
| 2002/0005640 A1 | 1/2002 | Nagata | |
| 2005/0156073 A1 | 7/2005 | Wier | |
| 2011/0140501 A1 * | 6/2011 | Shiotani | B60R 22/4628 |
| | | | 297/474 |
| 2012/0011847 A1 * | 1/2012 | Borg et al. | 60/632 |
| 2012/0013111 A1 * | 1/2012 | Nagata | B60R 22/4633 |
| | | | 280/806 |

FOREIGN PATENT DOCUMENTS

| | | | |
|---|---|---|---|
| FR | 2938884 B1 * | 2/2013 | |
| JP | 2009-241863 A | 10/2009 | |
| JP | 2009-269463 A | 11/2009 | |
| KR | 10-0898002 B1 | 5/2009 | |
| KR | 10-0898003 B1 | 5/2009 | |
| WO | 2010/100771 A1 | 9/2010 | |

* cited by examiner

PRETENSIONER

CROSS-REFERENCE TO RELATED APPLICATION

This application claims priority under 35 USC 119 from Japanese Patent Applications No. 2010-285911 filed on Dec. 22, 2010, and No. 2011-176102 filed on Aug. 11, 2011, the disclosures of which are incorporated by reference herein.

BACKGROUND OF THE INVENTION

1. Technical Field

The present invention relates to a pretensioner that configures a seat belt device of a vehicle.

2. Related Art

The pretensioner disclosed in Japanese Patent Application Laid-Open (JP-A) No. 2009-241863 is equipped with a piston that is slidable inside a cylinder. When the piston is caused to slide by the pressure of a gas that has been generated as a result of a gas generator attached to the cylinder being actuated, a rack bar integrated with the piston causes a pinion to rotate, a spool is rotated in a retraction direction by the rotation of the pinion, and webbing is retracted onto the spool.

SUMMARY

Incidentally, when detaching a seat belt device that has become unnecessary from a vehicle, it is preferred that the gas inside the cylinder of the pretensioner be let out beforehand. Therefore, it may be preferable to dispose a small hole for letting out the gas in the piston when, for example, when a seat belt device is manufactured.

However, if the inner diameter dimension of the small hole is too small, it is easy for the small hole to become clogged with cinders of the agent that was combusted in order to generate the gas. Conversely, if the inner diameter dimension of the small hole is too large, the gas ends up escaping unnecessarily in a state where the pretensioner is operating. In this way, setting the shape of the hole for letting out the gas has been difficult.

In view of the above-described circumstances, the present invention obtains a pretensioner that can effectively suppress clogging resulting from cinders of an agent and in which a gas does not escape unnecessarily.

A pretensioner of a first aspect of the invention includes: a gas generating unit which, when actuated, causes an agent to combust to thereby generate a gas; a pretensioner body to which the gas generating unit is attached and to whose inside the gas that has been generated by the gas generating unit is supplied; a spool driving member that is disposed inside the pretensioner body, is caused to move by the pressure of the gas that has been supplied to the inside of the pretensioner body, and by this movement causes a spool to rotate to thereby retracting webbing onto the spool; a gas flow rate adjusting portion that is disposed in the spool driving member, a gas passage direction downstream side of the gas flow rate adjusting portion communicating with an opposite side of a gas generating unit side with respect to the spool driving member, and whose inner peripheral shape is set in accordance with the flow rate of the gas to be passed through the gas flow rate adjusting portion; and a filter unit that has, or forms, a vent portion that is communicated with a space between the gas generating unit and the spool driving member and is also communicated with the gas flow rate adjusting portion. An open shape of the gas flow rate adjusting portion and an open shape of the vent portion are set in such a way that the open shape of the gas flow rate adjusting portion does not coincide in a plan view with the open shape of the vent portion, and the overall open area of the vent portion is set larger than the open area of the gas flow rate adjusting portion.

In the pretensioner of the first aspect, the gas is generated when the gas generating unit is actuated and the agent disposed in the gas generating unit combusts, and the gas is supplied to the pretensioner body. When the gas is supplied to the pretensioner body, the spool driving member inside the pretensioner body is caused to move by the pressure of the gas. Because of this, the spool rotates in a retraction direction and retracts the webbing from the proximal end side of the webbing.

The gas flow rate adjusting portion is formed in the spool driving member. The gas passage direction downstream side of the gas flow rate adjusting portion communicates with the opposite side of the gas generating unit side with respect to the spool driving member. Further, the gas flow rate adjusting portion is communicated with the vent portion of the filter unit.

The vent portion is communicated with the space between the gas generating unit and the spool driving member inside the pretensioner body, and the gas between the gas generating unit and the spool driving member inside the pretensioner body can pass through the vent portion of the filter unit and the gas flow rate adjusting portion and escape to the side of the spool driving member opposite the gas generating unit side. Consequently, after the actuation of the pretensioner has ended, the gas escapes to the side of the spool driving member opposite the gas generating unit side, whereby the high-pressure state between the gas generating unit and the spool driving member inside the pretensioner body can be eliminated.

Further, as described above, the gas escapes via the gas flow rate adjusting portion and the vent portion of the filter unit to the side of the spool driving member opposite the gas generating unit side, but the open shape of the gas flow rate adjusting portion is set in such a way that, for example, the flow rate of the gas becomes such that there is no hindrance with respect to causing the spool to rotate to retract the webbing. Consequently, the pressure of the gas that has been supplied to the pretensioner body can cause the spool to retract the webbing so that the body of the vehicle occupant can be restrained more strongly than before.

When the gas that has been generated by the gas generating unit is supplied to the inside of the pretensioner body, cinders of the agent that was combusted in order to generate the gas are also sent into the inside of the pretensioner body. In the pretensioner of the first aspect, the shape of the vent portion and the shape of the gas flow rate adjusting portion are set in such a way that, in a case where the setting range of the vent portion and the open shape of the gas flow rate adjusting portion are seen superimposed in a plan view, the open shape of the vent portion and the open shape of the gas flow rate adjusting portion do not coincide. Moreover, the overall open area of the vent portion on the gas entrance side is set larger than the open area of the gas flow rate adjusting portion, so an opening remains even if part of the vent portion becomes blocked by the cinders of the agent.

Consequently, even in this state the gas with the flow rate which is set according to the gas flow rate adjusting portion can be caused to flow into the vent portion from the outer sides of the cinders and can pass through the vent portion and the gas flow rate adjusting portion and escape to the side of the spool driving member opposite the gas generating unit side inside the pretensioner body. Because of this, the high-pressure state between the gas generating unit and the spool driving member inside the pretensioner body can be effectively eliminated.

In a pretensioner of a second aspect of the invention, in the first aspect, a setting range of the vent portion may be set larger than a setting range of the gas flow rate adjusting portion.

In the pretensioner of the second aspect, the setting range of the vent portion is larger than the setting range of the gas flow rate adjusting portion. For this reason, even if cinders of the agent of a size that can pass through the gas flow rate adjusting portion block a part of the vent portion, remaining part of the vent portion is open.

In a pretensioner of a third aspect of the invention, in the first aspect or the second aspect, plurality of the vent portions may be set, the respective open areas of the vent portions may be set smaller than the open area of the gas flow rate adjusting portion, and a sum total of the open areas of all of the vent portions may be set larger than the open area of the gas flow rate adjusting portion.

According to the pretensioner of the third aspect, the individual open areas of the plurally set vent portions is set to become smaller than the open area of the gas flow rate adjusting portion and in such a way that the sum total of the open areas of the vent portions becomes larger than the open area of the gas flow rate adjusting portion.

For this reason, even if the cinders of the agent become caught on the filter unit, the difference between the sum total of the open areas of the vent portions without the cinders and the open area of the gas flow rate adjusting portion becomes somewhat smaller, but a sufficient quantity of the gas can be caused to pass through to the gas flow rate adjusting portion side.

In a pretensioner of a fourth aspect of the invention, in the first aspect to the third aspect, the pretensioner further includes an attachment hole that is formed in the spool driving member on a gas passage direction upstream side of the gas flow rate adjusting portion. The attachment hole has an end portion on the gas passage direction upstream side that opens larger than the open area of the gas flow rate adjusting portion and an end portion on the gas passage direction downstream side that is communicated with the gas flow rate adjusting portion, and the filter unit is attached to the attachment hole in such a way as to be inscribed in an inner peripheral portion of the attachment hole. Moreover, the vent portion that opens at both gas passage direction end portions of the filter unit attached to the attachment hole is formed in the filter unit.

According to the pretensioner of the fourth aspect, the attachment hole is formed on the gas passage direction upstream side of the gas flow rate adjusting portion in the spool driving member. The attachment hole is communicated with the gas flow rate adjusting portion. Further, the end portion of the attachment hole on the gas passage direction upstream side opens larger than the open area of the gas flow rate adjusting portion. The filter unit is attached to the attachment hole. The vent portion is formed in the filter unit, and the vent portion opens at both gas passage direction end portions of the filter unit attached to the attachment hole.

By giving the pretensioner this configuration, it suffices simply to attach the filter unit in which the vent portion has been formed beforehand to the attachment hole, so the configuration can be made simple In a pretensioner of a fifth aspect of the invention, in the first aspect or the second aspect, the pretensioner further includes an attachment hole that is formed in the spool driving member on a gas passage direction upstream side of the gas flow rate adjusting portion. The attachment hole has an end portion on the gas passage direction upstream side that opens larger than the open area of the gas flow rate adjusting portion and an end portion on the gas passage direction downstream side that is communicated with the gas flow rate adjusting portion. An outer peripheral shape of the filter unit is capable of being inscribed in an inner peripheral portion of the attachment hole and differs from an inner peripheral shape of the attachment hole, and a gap formed between the inner peripheral portion of the attachment hole and an outer periphery of the filter unit is used as the vent portion.

According to the pretensioner of the fifth aspect, the attachment hole is formed on the gas passage direction upstream side of the gas flow rate adjusting portion in the spool driving member. The attachment hole is communicated with the gas flow rate adjusting portion. Further, the end portion of the attachment hole on the gas passage direction upstream side opens larger than the open area of the gas flow rate adjusting portion.

The filter unit is attached to the attachment hole. Here, the outer peripheral shape of the filter unit is a shape that is inscribed in the inner peripheral portion of the attachment hole but differs from the inner peripheral shape of the attachment hole. For this reason, when the filter unit is attached to the attachment hole, a gap is formed between the inner peripheral portion of the attachment hole and the outer peripheral portion of the filter unit, and the gap becomes the vent portion.

In a pretensioner of a sixth aspect of the invention, in the first aspect to the fifth aspect, the pretensioner further includes an attachment hole that is formed in the spool driving member on a gas passage direction upstream side of the gas flow rate adjusting portion. The attachment hole has an end portion on the gas passage direction upstream side that opens larger than the open area of the gas flow rate adjusting portion and an end portion on the gas passage direction downstream side that is communicated with the gas flow rate adjusting portion. A plug whose outer peripheral shape is formed in a shape differing from an inner peripheral shape of the attachment hole and which is inserted into and held in the attachment hole is used as the filter unit. The plug has: an insertion portion where at least part of a gap formed between an outer peripheral portion of the insertion portion and an inner peripheral portion of the attachment hole is communicated with the gas flow rate adjusting portion; and a head portion that is positioned on the gas generating unit side of the spool driving member in a state where the insertion portion has been inserted into the attachment hole. An opening formed in an outer peripheral surface of the head portion is communicated with the gap between the inner peripheral portion of the attachment hole and the outer peripheral portion of the insertion portion.

According to the pretensioner of the sixth aspect, the attachment hole is formed on the gas passage direction upstream side of the gas flow rate adjusting portion in the spool driving member. The attachment hole is communicated with the gas flow rate adjusting portion at the end portion of the attachment hole on the gas passage direction downstream side. A plug serving as filter unit is attached to the attachment hole.

The plug has the insertion portion, and the insertion portion which is inserted into the attachment hole. The outer peripheral shape of the insertion portion is set in such a way that part of the outer periphery of the insertion portion comes into contact with the inner peripheral portion of the attachment hole, and in a state where part of the outer periphery of the insertion portion has come into contact with the inner peripheral portion of the attachment hole, the insertion portion— and therefore the plug—is held in the inner peripheral portion of the attachment hole (that is, the spool driving member) by friction between part of the outer periphery of the insertion portion and the inner peripheral portion of the attachment hole. Consequently, in the pretensioner pertaining to the present invention, the plug (that is, the filter unit) can be attached to the spool driving member simply by inserting the insertion portion into the attachment hole.

Here, the outer peripheral shape of the insertion portion is set to be different from the inner peripheral portion of the attachment hole. Consequently, at the portion of the outer peripheral portion of the insertion portion, the outer peripheral portion is spaced apart from the inner peripheral portion of the attachment hole, and the gap is formed between the outer peripheral portion of the insertion portion and the inner peripheral portion of the attachment hole.

Further, the head portion is formed on the insertion portion that is inserted into the attachment hole in this way. The head portion is positioned on the gas generating unit side of the spool driving member in a state where the insertion portion has been inserted into the attachment hole, and the opening formed in the outer peripheral portion of the head portion is communicated with the gap between the outer peripheral portion of the insertion portion and the inner peripheral portion of the attachment hole. At least part of the gap is communicated with the gas flow rate adjusting portion, so the gas flows into the gap between the outer peripheral portion of the insertion portion and the inner peripheral portion of the attachment hole from the opening formed in the outer peripheral portion of the head portion, and further passes through the gas flow rate adjusting portion.

When claim 6 depends from claim 4 or 5, the gap between the outer peripheral portion of the insertion portion and the inner peripheral portion of the attachment hole may correspond to the vent portion. When claim 6 depends from any one of claims 1 to 3, the gap between the outer peripheral portion of the insertion portion and the inner peripheral portion of the attachment hole does not necessarily correspond to the vent portion but the opening formed in the outer peripheral surface of the head portion may correspond to the vent portion.

In a pretensioner of a seventh aspect of the invention, in the sixth aspect, the plug is configured to include: an insertion portion body, part of whose outer periphery contacts the inner peripheral portion of the attachment hole in a state where the insertion portion body has been inserted into the attachment hole; and a small diameter portion whose outer peripheral shape is formed slenderer than that of the insertion portion body on the side of the insertion portion body opposite the head portion side.

In the pretensioner of the seventh aspect, the insertion portion of the plug is configured to include the insertion portion body and the small diameter portion. The small diameter portion is formed on the side of the insertion portion body opposite the head portion side. When the insertion portion of the plug is inserted into the attachment hole, the small diameter portion is inserted into the attachment hole before the insertion portion body. Here, the outer peripheral shape of the small diameter portion is slenderer and is easier to insert into the attachment hole than the insertion portion body. Consequently, first the small diameter portion is inserted into the attachment hole, whereby next the insertion portion body can be easily inserted into the attachment hole.

In a pretensioner of an eighth aspect of the invention, in the first aspect to the third aspect, the filter unit is disposed at the gas generating unit side of an end portion of the spool driving member, the gas flow rate adjusting portion is communicated with a space between the end portion of the spool driving member on the gas generating unit side and the filter unit, and the vent portion is formed in the filter unit.

According to the pretensioner of the eighth aspect, the filter unit is disposed with respect to the spool driving member on the gas generating unit side of the end portion of the spool driving member. The vent portion is formed in the filter unit. The gas flow rate adjusting portion is communicated with the space between the filter unit of this configuration and the spool driving member, and the gas that has passed through the vent portion formed in the filter unit passes between the filter unit and the spool driving member and further passes through the gas flow rate adjusting portion.

In a pretensioner of a ninth aspect of the invention, in the first aspect to the third aspect and the eighth aspect, the filter unit is disposed with respect to the spool driving member on the gas generating unit side of an end portion of the spool driving member, a gap between an outer peripheral portion of the end portion of the spool driving member on the gas generating unit side and an outer peripheral portion of the filter unit is used as the vent portion, and the gas flow rate adjusting portion is communicated with a space between the end portion of the spool driving member on the gas generating unit side and the filter unit.

According to the pretensioner of the ninth aspect, the filter unit is disposed with respect to the spool driving member on the gas generating unit side of the end portion of the spool driving member. The space between the outer peripheral portion of the filter unit and the outer peripheral portion of the end portion of the spool driving member on the gas generating unit side is used as the vent portion, and the gas that has passed between the outer peripheral portion of the filter unit and the end portion of the spool driving member on the gas generating unit side further passes through the gas flow rate adjusting portion.

In the pretensioner of the ninth aspect, as described above, the space between the outer peripheral portion of the filter unit and the outer peripheral portion of the end portion of the spool driving member on the gas generating unit side is used as the vent portion, and the cinders of the agent become caught without being able to pass between the outer peripheral portion of the filter unit and the outer peripheral portion of the end portion of the spool driving member on the gas generating unit side.

Even in a state where the cinders have become caught between the outer peripheral portion of the filter unit and the outer peripheral portion of the end portion of the spool driving member in this way, the gas can pass between the outer peripheral portion of the filter unit and the outer peripheral portion of the end portion of the spool driving member where the cinders are not caught.

In a pretensioner of a tenth aspect of the invention, in the first aspect to the third aspect, disposed in the spool driving member are: a driving member body whose outer peripheral shape is smaller than the inner peripheral shape of the pretensioner body; an annular member that is attached to the driving member body in such a way as to surround an outer peripheral portion of the driving member body and whose inner peripheral portion contacts the outer peripheral portion of the driving member body in a state where the annular member has been attached to the driving member body. A groove portion that opens at an end portion of the driving member body on the gas generating unit side and the outer peripheral portion of the driving member body and is communicated with the gas flow rate adjusting portion is formed in the outer peripheral portion of the driving member body. The groove portion that is spaced apart from the inner peripheral portion of the annular member in a state where the annular member has been attached to the driving member body is used as the vent portion, and the driving member body and the annular member are used as the filter unit.

According to the pretensioner of the tenth aspect, the outer peripheral shape of the driving member body configuring the spool driving member is set smaller than the inner peripheral shape of the pretensioner body, and the annular member is attached to the outer peripheral portion of the driving member body.

Here, the groove portion that opens at the outer peripheral portion of the driving member body and also opens at the end portion of the driving member body on the gas generating unit side is formed as the vent portion of the driving member body. As described above, when the annular member is attached to the driving member body, the outer peripheral portion of the driving member body comes into contact with the inner peripheral portion of the annular member, but the groove portion does not come into contact with the inner peripheral portion of the annular member, and for this reason the opening of the groove portion at the outer peripheral portion of the driving member body becomes closed by the annular member.

The gas that has flowed in to the inner side of the groove portion from the opening of the groove portion on the gas generating unit side of the driving member body heads toward the gas flow rate adjusting portion that is communicated with respect to the groove portion.

As described above, the pretensioner pertaining to the present invention can effectively suppress clogging of a vent portion resulting from cinders of an agent and can discharge gas. Moreover, a lot of gas can be prevented from escaping unnecessarily at the time when the pretensioner is actuated.

BRIEF DESCRIPTION OF THE DRAWINGS

Embodiments of exemplary examples of the present invention will be described in detail based on the following figures, wherein.

DETAILED DESCRIPTION OF THE INVENTION

Embodiments of exemplary examples of the present invention will be described on the basis of FIG. 1 to FIG. 25. In describing the embodiments below, in relation to portions that are basically identical to those in preceding embodiments and modifications, identical reference signs will be given thereto and detailed description thereof will be omitted.

Configuration of First Embodiment (Basic Configuration of Pretensioner 10)

Figure 1:
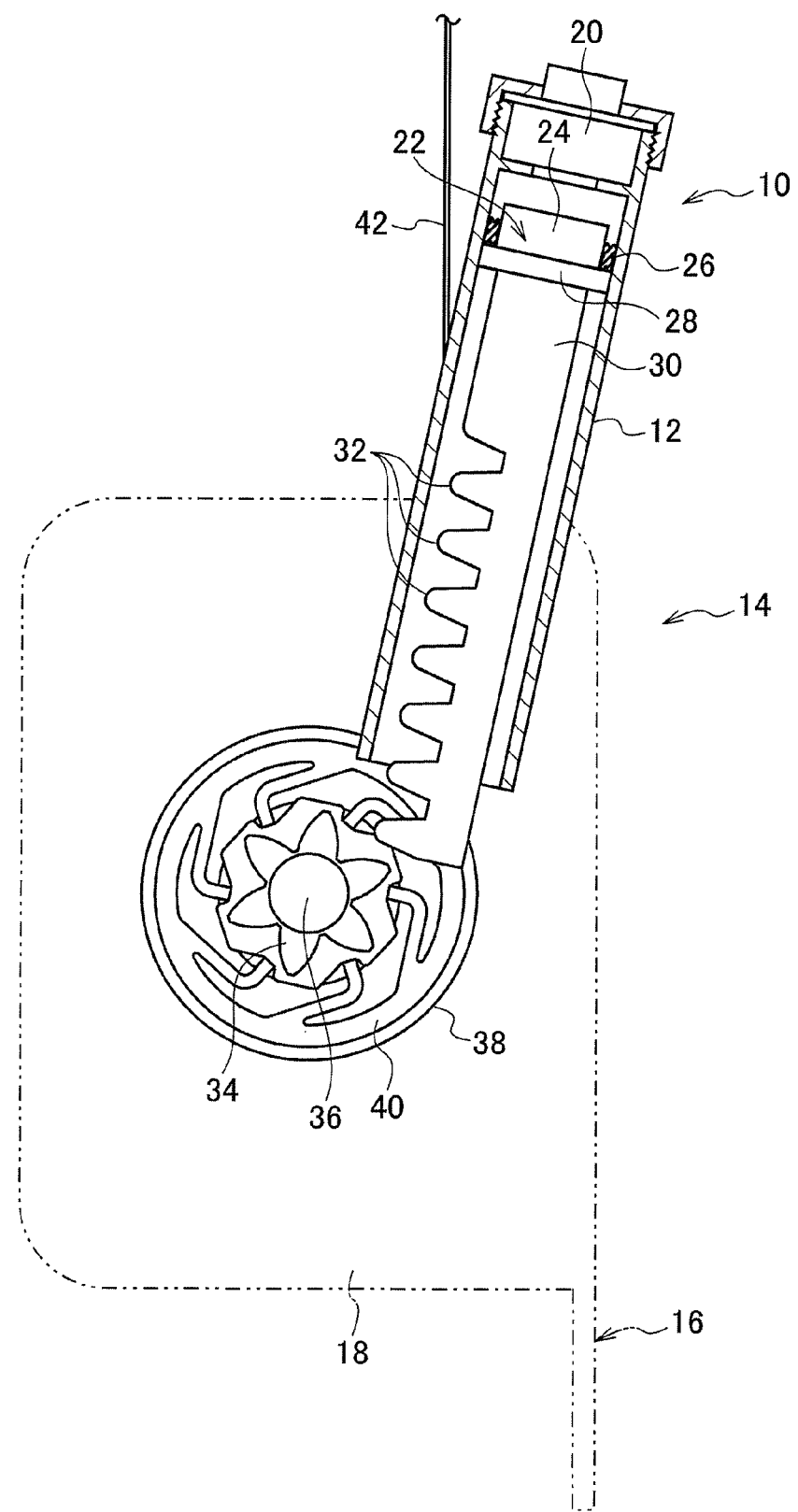
FIG. 1 is a side view of a pretensioner pertaining to a first embodiment.

In FIG. 1, a pretensioner 10 pertaining to a first embodiment is shown by way of a side view. As shown in FIG. 1, the pretensioner 10 is equipped with a cylinder 12 serving as a pretensioner body. The cylinder 12 is formed in a circular tube shape whose axial direction is tilted in a vehicle width direction with respect to a vehicle up-and-down direction. The cylinder 12 is placed on the outer side of a leg plate 18 configuring a frame 16 of a webbing retractor 14 and is fixed to the leg plate 18 by a predetermined fixing bracket or the like.

A gas generator 20 serving as gas generating units is attached to the axial direction upper end portion of the cylinder 12. The gas generator 20 is electrically connected via an ECU serving as control unit to a battery installed in the vehicle and an acceleration sensor that detects the acceleration of the vehicle at the time of a vehicle impact. When a detection signal from the acceleration sensor is inputted to the ECU, the ECU actuates the gas generator 20. The gas generator 20 causes an agent such as a gas-generating agent to combust and jets a gas toward the inside of the cylinder 12 (the lower side of the cylinder 12).

A piston 22 serving as a spool driving member is disposed on the inner side of the cylinder 12. The piston 22 is equipped with a substantially circular cylinder-shaped piston body 24 serving as a driving member body. The axial direction of the piston body 24 is the same direction as the axial direction of the cylinder 12, and the outer diameter dimension of the piston body 24 is set shorter than the inner diameter dimension of the cylinder 12. An X-ring 26 serving as a sealing member (an annular sealing member) that configures the piston 22 together with the piston body 24 is attached to the piston body 24.

The X-ring 26 is formed in a ring-like shape overall. The cross-sectional shape of the X-ring 26 when the X-ring 26 is cut along its radial direction is a substantial X shape. The X-ring 26 is formed by a synthetic resin material capable of elastic deformation such as rubber and is attached to the outer peripheral portion of the piston body 24 in a state where the X-ring 26 is elastically deformed and its diameter is expanded. In this way, the inner peripheral portion of the X-ring 26 that has been attached to the piston body 24 presses against the outer peripheral portion of the piston body 24 to thereby seal the space between the outer peripheral portion of the piston body 24 and the inner peripheral portion of the X-ring 26, and the outer peripheral portion of the X-ring 26 presses against the inner peripheral portion of the cylinder 12 to thereby seal the space between the inner peripheral portion of the cylinder 12 and the outer peripheral portion of the X-ring 26.

A flange portion 28 that configures the piston 22 together with the piston body 24 and the X-ring 26 is formed on the axial direction lower end portion of the piston body 24. The flange portion 28 is formed in a disc shape whose outer diameter dimension is slightly shorter than the inner diameter dimension of the cylinder 12. The flange portion 28 is formed coaxially with respect to the piston body 24. In a state where the piston 22 has been placed on the inner side of the cylinder 12, a slight gap is formed between the inner peripheral portion of the cylinder 12 and the outer peripheral portion of the flange portion 28.

A rack bar 30 is disposed on the side of the flange portion 28 opposite the piston body 24 side. The rack bar 30 is formed in a rod-like shape whose cross-sectional shape is rectangular and whose lengthwise direction is along the axial direction of the cylinder 12. The rack bar 30 is integrally connected to the flange portion 28 at the lengthwise direction proximal end portion of the rack bar 30. Rack teeth 32 are formed on one width direction end of the rack bar 30. The rack teeth 32 are formed every predetermined interval between the lengthwise direction distal end of the rack bar 30 and the lengthwise direction middle portion of the rack bar 30.

A pinion 34 is disposed under the cylinder 12. The pinion 34 is supported, in such a way that it may freely rotate, on a rod-like shaft portion 36. The axial direction proximal end portion of the shaft portion 36 is formed projecting coaxially from one axial direction end portion of a spool 38 or one axial direction end portion of a torsion shaft that is disposed coaxially with respect to the spool 38 and is connected in such a way as to be incapable of relative rotation with respect to the spool 38.

A clutch member 40 is attached to the pinion 34. When the pinion 34 rotates in a retraction direction that is one direction about its central axis, part of the clutch member 40 deforms and becomes substantially integrally coupled to the spool 38. Because of this, the pinion 34 becomes coaxially and integrally coupled to the spool 38 via the deformed clutch member 40. The lengthwise direction proximal end side of a long band-like webbing 42 is fixed to the spool 38, and the webbing 42 is retracted onto the spool 38 when the spool 38 rotates in the retraction direction.

(Characteristic Configurations of Pretensioner 10)

A gas escape hole 52 is formed in the piston 22. The gas escape hole 52 is equipped with an attachment hole 54. The attachment hole 54 is formed as a circular hole whose depth direction is along the axial direction of the piston 22. One end of the attachment hole 54 opens at the end surface of the piston body 24 on the side opposite the flange portion 28 side—that is, the end surface of the piston body 24 on the gas generator 20 (gas generating units) side.

Further, a regulation hole 58 is formed continuously from the other end of the attachment hole 54 and coaxially with respect to the attachment hole 54. The regulation hole 58 is formed in the shape of a circular truncated cone whose inner diameter dimension on one end is equal to the inner diameter dimension of the attachment hole 54 and whose inner diameter dimension gradually becomes smaller away from the attachment hole 54 along the axial direction of the piston 22. A gas flow rate adjusting hole 60 serving as a gas flow rate adjusting portion is formed continuously from the other end of the regulation hole 58 (the end portion of the regulation hole 58 on the side opposite the attachment hole 54 side). The open shape of the gas flow rate adjusting hole 60 is set on the basis of the flow rate of the gas to be passed through the gas flow rate adjusting hole 60 per unit of time in a case where the internal pressure inside the cylinder 12 between the gas generator 20 and the piston 22 is a predetermined value. The end portion of the gas flow rate adjusting hole 60 on the side opposite the regulation hole 58 side opens at the end surface of the flange portion 28 on the side opposite the piston body 24 side.

A filter member 62 serving as filter unit is press-fitted into the attachment hole 54. The filter member 62 basically is formed in a circular column shape. The outer diameter dimension of the filter member 62 is equal to the inner diameter dimension of the attachment hole 54, and the axial direction dimension of the filter member 62 is equal to the axial direction length of the attachment hole 54. Numerous vent holes 64 serving as vent portions are formed in the filter member 62. Each of the vent holes 64 is formed as a cross-sectionally circular hole whose one end opens at one axial direction end surface of the filter member 62 and whose other end opens at the other axial direction end surface of the filter member 62. The vent holes 64 basically open at only both of their ends, but due to steps and forming methods of the filter member 62 and the vent holes 64 in the filter member 62, vent holes that open at both ends and also at the outer peripheral surface of the filter member 62 may also exist.

The individual open shapes of the vent holes 64 are smaller than the open shape of the gas flow rate adjusting hole 60. That is, in a case where the open shapes of the vent holes 64 and the open shape of the gas flow rate adjusting hole 60 are seen superimposed in a plan view, the open shape of the gas flow rate adjusting hole 60 is larger than the open shapes of the vent holes 64. Further, the setting range of the vent holes 64 in the end surfaces of the filter member 62 is larger than the open shape of the gas flow rate adjusting hole 60. Consequently, when the open shape of the gas flow rate adjusting hole 60 and the shape of the end surface of the filter member 62 on the side opposite the gas flow rate adjusting hole 60 side are seen superimposed, any of the plural vent holes 64 are positioned outside the range of the gas flow rate adjusting hole 60. For this reason, even if cinders 56 come into contact with the axial direction one end surface of the filter member 62 and any of the vent holes 64 become blocked by the cinders 56, any of the other vent holes 64 do not become blocked by the cinders 56.

Moreover, the open area of each of the vent holes 64 and the number of the vent holes 64 are set in such a way that the sum total of the open areas of all of the vent holes 64 in the end surface of the filter member 62 becomes larger than the open area of the gas flow rate adjusting hole 60 on the flange portion 28 side.

In relation to the individual open shapes of the vent holes 64, for example, if the shapes of the cinders 56 are predictabel, it is preferred that the individual open shapes of the vent holes 64 be set smaller than the smallest width dimension of the cinders 56 when the cinders 56 are seen from various directions. Further, if the shapes of the cinders 56 are unclear, it is preferred that the individual open shapes of the vent holes 64 be set smaller than the smallest width dimension of the agent before combustion when the agent before combustion is seen from various directions.

Further, the inner diameter dimension of the attachment hole 54 into which the filter member 62 is press-fitted is equal to the outer diameter dimension of the filter member 62, but the regulation hole 58 is formed in the shape of a circular truncated cone whose inner diameter dimension becomes shorter away from the attachment hole 54. For this reason, the filter member 62 that has been press-fitted into the attachment hole 54 does not enter the regulation hole 58, and the open ends of the vent holes 64 in the end surface of the filter member 62 on the side that has been press-fitted into the attachment hole 54 do not become blocked by the inner peripheral surface of the regulation hole 58 or the like.

Action and Effects of First Embodiment (Basic Operation of Pretensioner 10)

When, in a state where the vehicle occupant seated in the vehicle is wearing the webbing 42, a state of sudden deceleration that is similar to a case where the vehicle impacts an obstacle in front of the vehicle arises and the acceleration sensor detects the deceleration (acceleration) of the vehicle at this time, the ECU actuates the gas generator 20. When the gas generator 20 is actuated, the agent such as a gas-generating agent inside the gas generator 20 is combusted, whereby the gas is instantaneously generated. The gas that has been generated is supplied to the inside of the cylinder 12.

Then, when the internal pressure inside the cylinder 12 between the piston 22 and the gas generator 20 rises, the piston 22 descends and the rack teeth 32 of the rack bar 30 integrated with the piston 22 mesh with the pinion 34 and cause the pinion 34 to rotate in the retraction direction. When the pinion 34 rotates in the retraction direction, deformation arises in the clutch member 40 that is attached in such a way as to be incapable of relative rotation with respect to the pinion 34, and the clutch member 40 becomes integrally connected to the spool 38. When the pinion 34 becomes coaxially and integrally connected to the spool 38 via the clutch member 40 in this way, the rotation of the pinion 34 in the retraction direction is transmitted to the spool 38 and causes the spool 38 to rotate in the retraction direction, and the webbing 42 worn on the body of the vehicle occupant is retracted onto the spool 38. Because of this, the body of the vehicle occupant becomes restrained by the webbing 42 more strongly than before.

(Characteristic Operation of the Pretensioner 10 and Effects Thereof)

In the pretensioner 10, the gas flow rate adjusting hole 60 formed in the piston 22 is connected to the attachment hole 54 via the regulation hole 58. The filter member 62 is press-fitted into the attachment hole 54, but because the vent holes 64 open at both ends of the filter member 62, the regulation hole 58 is connected to the vent holes 64. Consequently, the upper side of the piston 22 (the gas generator 20 side) inside the cylinder 12 and the lower side of the piston 22 (the side opposite the gas generator 20 side) inside the cylinder 12 are communicated with each other via the gas flow rate adjusting hole 60, the regulation hole 58, and the vent holes 64 in the filter member 62.

For this reason, after the sliding of the piston 22 resulting from the rise in the internal pressure inside the cylinder 12 has ended, the gas passes through the vent holes 64 in the filter member 62, the regulation hole 58, and the gas flow rate adjusting hole 60 to the lower side of the piston 22 inside the cylinder 12 and escapes from the open end on the lower side of the cylinder 12. Because of this, when the pretensioner 10 has been actuated, the internal pressure inside the cylinder 12 on the upper side of the piston 22 is not maintained in a high state.

Further, also when the piston 22 is sliding because of the rise in the internal pressure inside the cylinder 12, the gas passes through the vent holes 64 in the filter member 62, the regulation hole 58, and the gas flow rate adjusting hole 60. The quantity of the gas that passes through the vent holes 64 in the filter member 62, the regulation hole 58, and the gas flow rate adjusting hole 60 in this state is decided by the inner diameter dimension of the gas flow rate adjusting hole 60 (the inner peripheral shape of the gas flow rate adjusting hole 60). The inner diameter dimension of the gas flow rate adjusting hole 60 (the inner peripheral shape of the gas flow rate adjusting hole 60)—and therefore the gas passage quantity—is set in such a way that there is no hindrance with respect to the descent of the piston 22 and the rack bar 30 causing the pinion 34 to rotate in the retraction direction. Consequently, the gas escapes also when the piston 22 is sliding because of the rise in the internal pressure inside the cylinder 22, but the piston 22 can be sufficiently lowered and the pinion 34—and therefore the spool 38—can be caused to rotate in the retraction direction.

When the gas generator 20 is actuated, the agent such as a gas-generating agent is combusted, the gas is produced, and the cinders 56 of the agent are released into the inside of the cylinder 12 together with the gas. Here, in the pretensioner 10, although the individual open shapes of the vent holes 64 are set smaller than the open shape of the gas flow rate adjusting hole 60, the setting range of the vent holes 64 in the end surface of the filter member 62 on the side opposite the gas flow rate adjusting hole 60 side is larger than the open shape of the gas flow rate adjusting hole 60. That is, when the open shape of the gas flow rate adjusting hole 60 and the shape of the end surface of the filter member 62 on the side opposite the gas flow rate adjusting hole 60 side are superimposed, any of the plural vent holes 64 are positioned outside the range of the gas flow rate adjusting hole 60.

For this reason, even if the cinders 56 come into contact with the axial direction one end surface of the filter member 62 and any of the vent holes 64 become blocked by the cinders 56, any of the other vent holes 64 do not become blocked by the cinders 56.

Moreover, the open area of each of the vent holes 64 and the number of the vent holes 64 are set in such a way that the sum total of the open areas of all of the vent holes 64 in the end surface of the filter member 62 becomes larger than the open area of the gas flow rate adjusting hole 60 on the flange portion 28 side. For this reason, even if the cinders 56 come into contact with the axial direction one end surface of the filter member 62 and any of the vent holes 64 become blocked by the cinders 56, any of the other vent holes 64 do not become blocked by the cinders 56. For this reason, even if the cinders 56 block any of the vent holes 64, the difference between the sum total of the open areas of the vent holes 64 not blocked by the cinders 56 and the open area of the gas flow rate adjusting hole 60 becomes smaller, but the gas with the necessary flow rate can be released.

Modifications of First Embodiment

Next, modifications of the present embodiment will be described.

(First Modification)

As described above, in the present embodiment, the numerous vent holes 64 are formed in the filter member 62. However, the vent portion may also be single as long as the cinders 56 cannot pass through the vent portion and the setting range of the vent portion is larger than the cinders 56. That is, in a first modification of the present embodiment shown in FIG. 5, a single curved slit-like vent hole 74 is formed in a filter member 72 serving as filter unit. The lengthwise dimension of the vent hole 74 in plan view is larger than the largest projected shape of the cinders 56, and the width dimension of the vent hole 74 is a size through which the cinders 56 cannot pass. Even with this configuration equipped with the vent hole 74, the same action as in the first embodiment can be provided and the same effects as in the first embodiment can be obtained.

(Second Modification)

Further, in the present embodiment, the numerous vent holes 64 are formed on the inner side of the outer peripheral portion of the filter member 62. However, the pretensioner 10 may also be given a configuration where a gap is formed between the inner peripheral portion of the attachment hole and the outer peripheral portion of the filter unit attached to the attachment hole, and the gap may be used as the vent portion.

Figure 6:
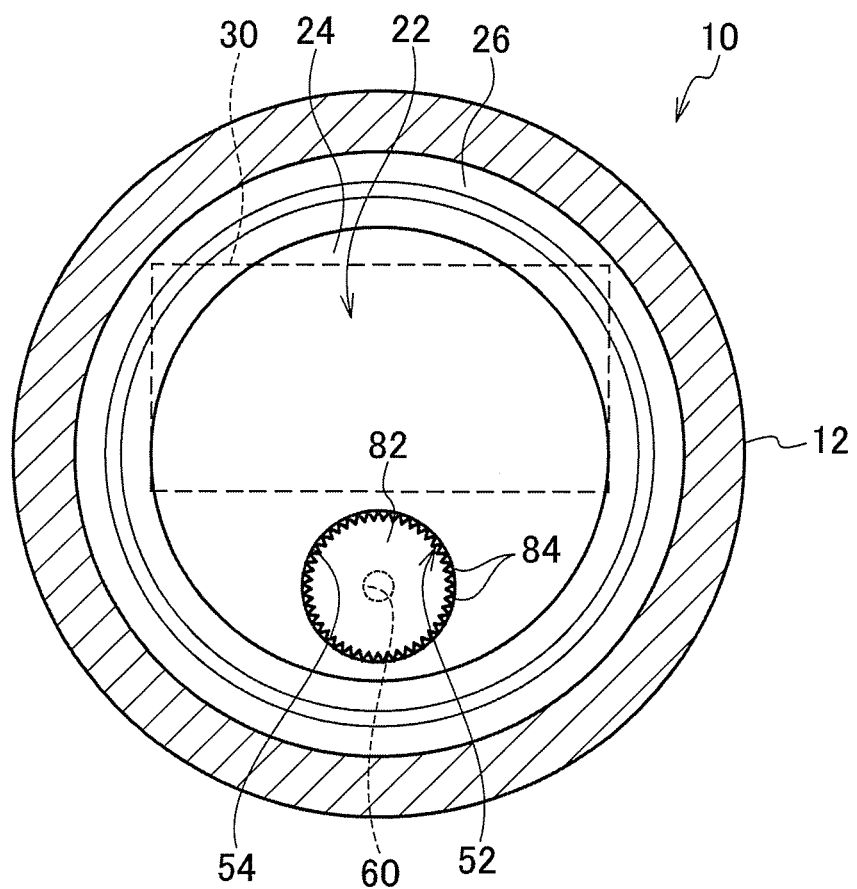
FIG. 6 is an enlarged plan sectional view corresponding to FIG. 4 showing a second modification of the first embodiment.

Namely, in a second modification of the present embodiment shown in FIG. 6, a filter member 82 has a circular cylinder shape whose outer diameter dimension is substantially equal to the inner diameter dimension of the attachment hole 54, but plural grooves 84 serving as vent portions are formed at the outer peripheral portion of the filter member 82 having every predetermined interval in the circumferential direction of the filter member 82. The grooves 84 open at both axial direction ends of the filter member 82 and also open at the outer peripheral portion of the filter member 82. Because the grooves 84 are formed, the filter member 82 does not strictly speaking have a circular cylinder shape, and gaps serving as vent portions that open at both ends of the attachment hole 54 are formed between the grooves 84 and the inner peripheral portion of the attachment hole 54. Even with this configuration, the same action as in the first embodiment can be provided and the same effects as in the first embodiment can be obtained.

(Third Modification)

Figure 7:
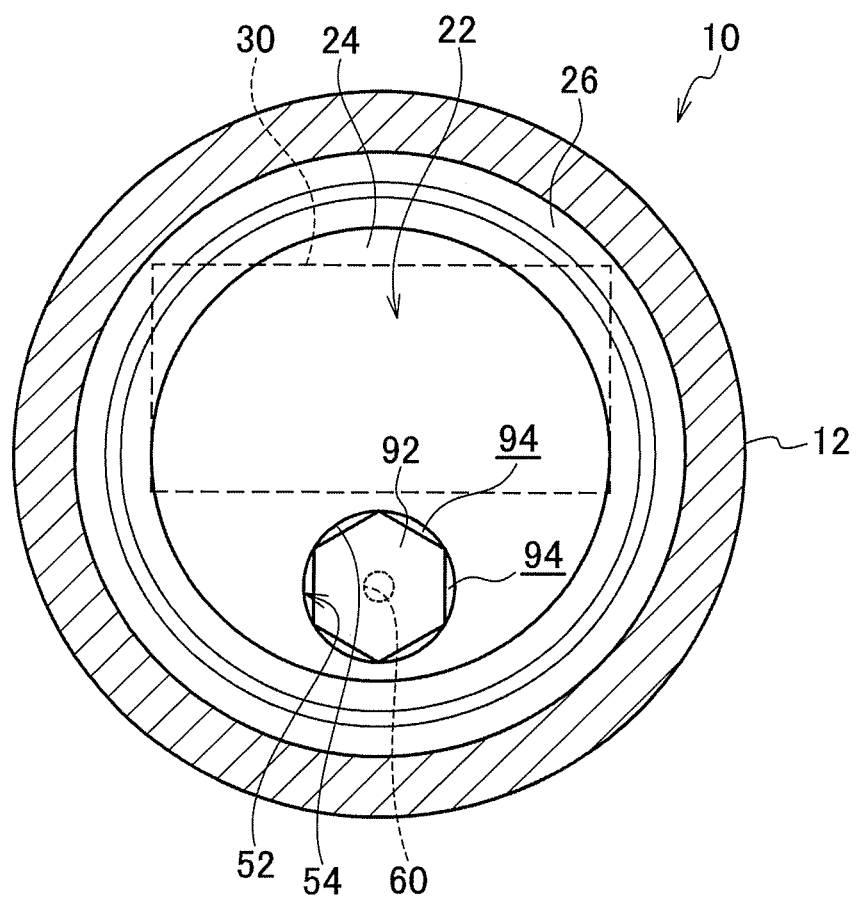
FIG. 7 is an enlarged plan sectional view corresponding to FIG. 4 showing a third modification of the first embodiment.

Further, in a third modification of the present embodiment shown in FIG. 7, the outer peripheral shape of a filter member 92 serving as filter unit is formed in a polygonal shape (in this modification, a hexagonal shape) that is inscribed in the inner peripheral shape of the attachment hole 54. For this reason, when the filter member 92 is press-fitted into the attachment hole 54, plural gaps 94 serving as vent portions that open at both ends of the attachment hole 54 are formed between the inner peripheral portion of the attachment hole 54 and the outer peripheral portion of the filter member 92. Even with this configuration, the same action as in the first embodiment can be provided and the same effects as in the first embodiment can be obtained.

(Fourth Modification)

Figure 8:
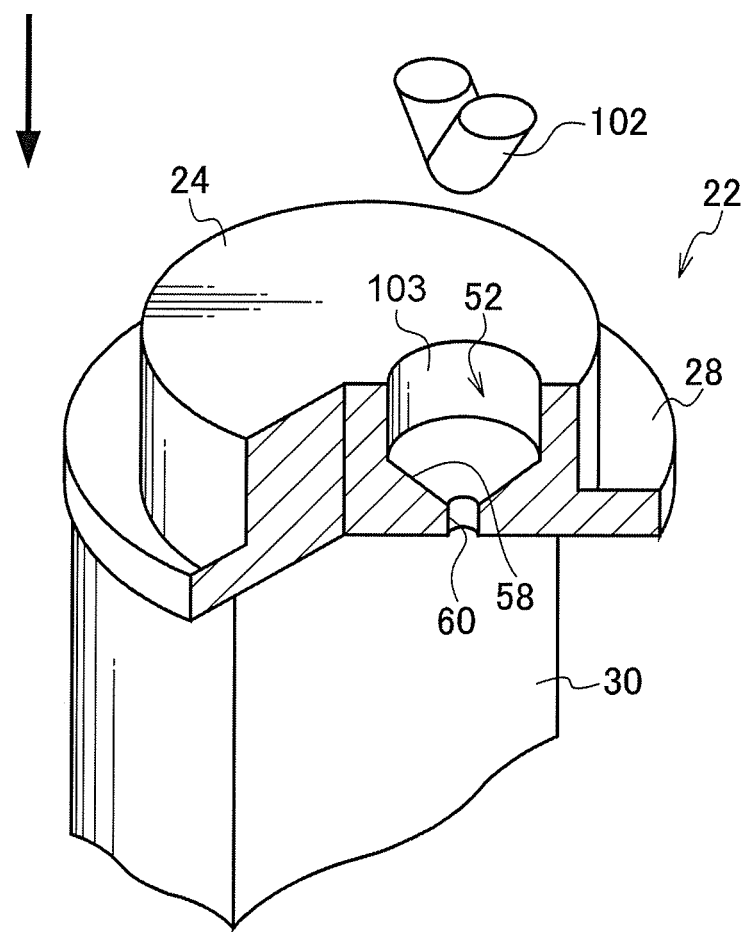
FIG. 8 is an enlarged exploded perspective view corresponding to FIG. 2 showing a fourth modification of the first embodiment.
Figure 9:
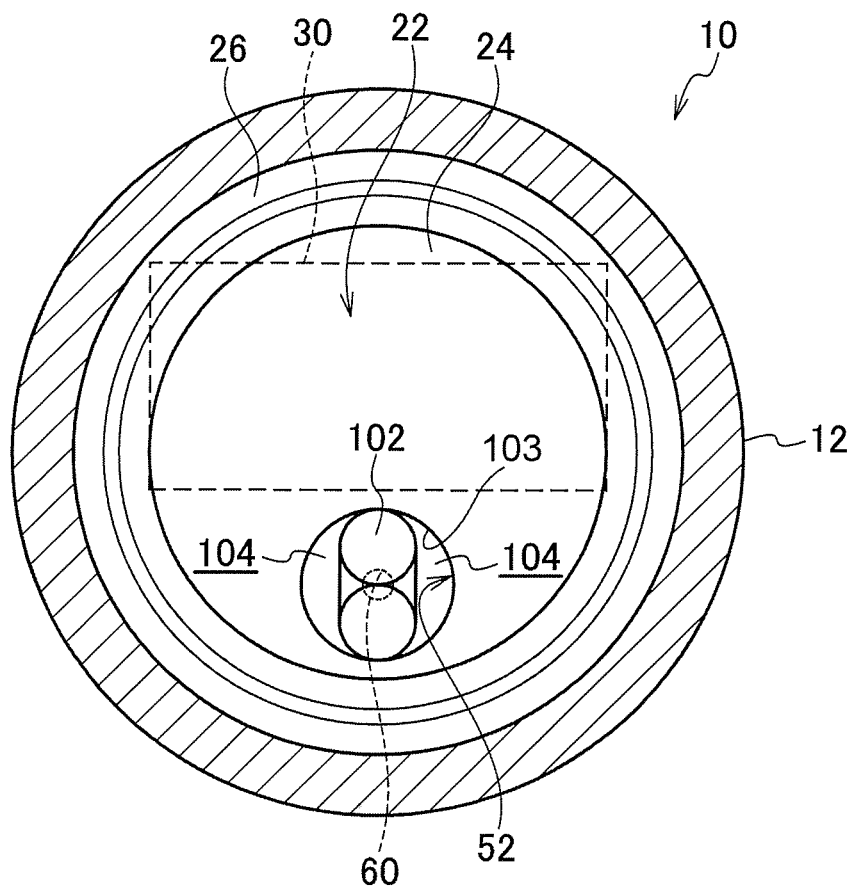
FIG. 9 is an enlarged plan sectional view corresponding to FIG. 4 showing the fourth modification of the first embodiment.

Moreover, in a fourth modification of the present embodiment shown in FIG. 8 and FIG. 9, a filter member 102 is formed by bending a cross-sectionally circular rod-like member into a substantial V shape. The filter member 102 is press-fitted from its bent portion side into an attachment hole 103 instead of the attachment hole 54. The attachment hole 103 differs from the attachment hole 54 in that the attachment hole 103 is formed in a long hole shape (or an elliptical shape) whose open width dimension is smaller than the sum of the diameter dimension of the gas flow rate adjusting hole 60 and the outer diameter dimension of the filter member 102. For this reason, plural gaps 104 serving as vent portions that open at both ends of the attachment hole 103 are formed between the outer peripheral portion of the filter member 102 press-fitted into the attachment hole 103 and the inner peripheral portion of the attachment hole 103. Even with this configuration, the same action as in the first embodiment can be provided and the same effects as in the first embodiment can be obtained.

(Fifth Modification)

Figure 10:
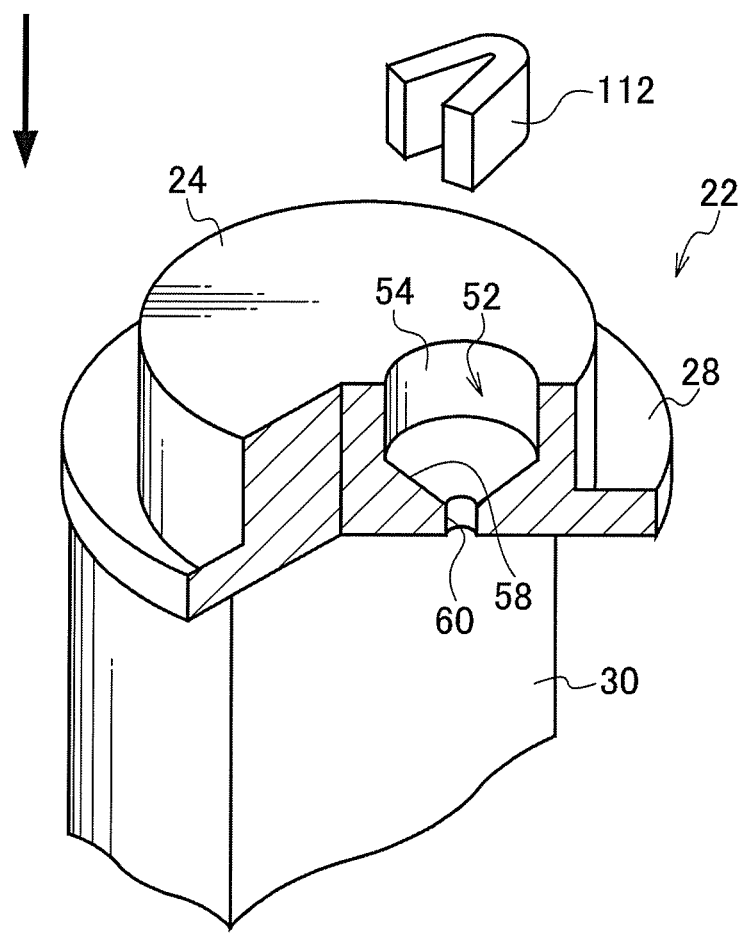
FIG. 10 is an enlarged exploded perspective view corresponding to FIG. 2 showing a fifth modification of the first embodiment.

Further, in a fifth modification of the present embodiment shown in FIG. 10, a filter member 112 serving as filter unit is formed as a result of a plate material whose width dimension is about the same as the depth dimension of the attachment hole 54 being bent into a substantial V shape about an axis that takes the width direction as its axial direction. In a state where the filter member 112 has been press-fitted into the attachment hole 54, both lengthwise direction ends of the filter member 112 and the bent portion of the filter member 112 press against the inner peripheral portion of the attachment hole 54. For this reason, plural gaps serving as vent portions that open at both ends of the attachment hole 54 are formed between the outer peripheral portion of the filter member 112 press-fitted into the attachment hole 54 and the inner peripheral portion of the attachment hole 54. Even with this configuration, the same action as in the first embodiment can be provided and the same effects as in the first embodiment can be obtained.

(Sixth Modification)

Figure 11:
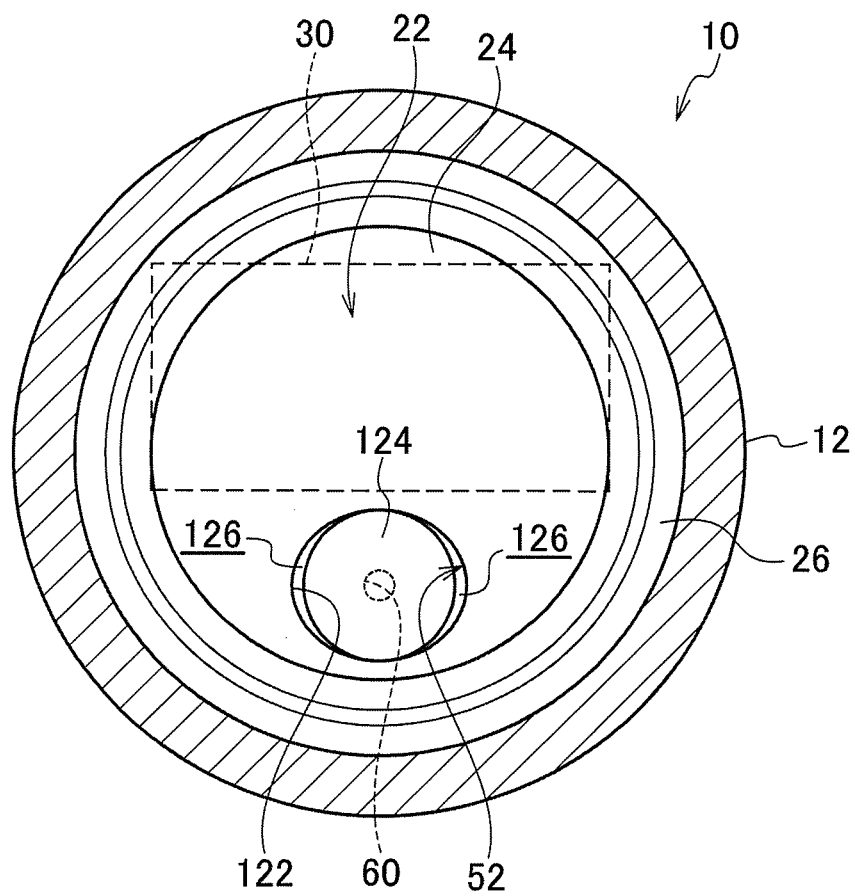
FIG. 11 is an enlarged plan sectional view corresponding to FIG. 4 showing a sixth modification of the first embodiment.

Moreover, in a sixth modification of the present embodiment shown in FIG. 11, the gas escape hole 52 is formed at an attachment hole 122 instead of the attachment hole 54. The attachment hole 122 differs from the attachment hole 54 in that the open shape of the attachment hole 122 is formed in an elliptical shape. A filter member 124 serving as filter unit is formed in a circular column shape whose outer diameter dimension is substantially equal to the minor diameter dimension of the attachment hole 122. When the filter member 124 is press-fitted into the attachment hole 122, two gaps 126 serving as vent portions are formed on both sides of the filter member 124 in the major diameter direction of the attachment hole 122. Even with this configuration, the same action as in the first embodiment can be provided and the same effects as in the first embodiment can be obtained.

(Seventh Modification)

Figure 12:
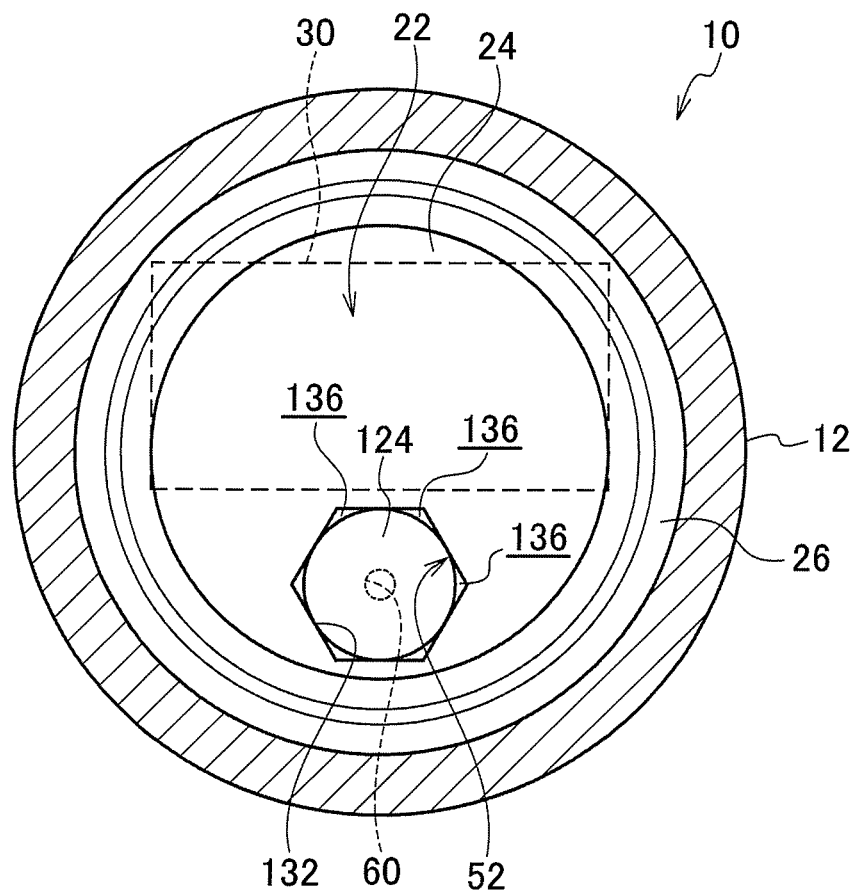
FIG. 12 is an enlarged plan sectional view corresponding to FIG. 4 showing a seventh modification of the first embodiment.

Moreover, in a seventh modification of the present embodiment shown in FIG. 12, the gas escape hole 52 is formed at an attachment hole 132 instead of the attachment hole 54. The attachment hole 132 differs from the attachment hole 54 in that the open shape of the attachment hole 132 is formed in a polygonal shape (in this modification, a hexagonal shape). A filter member 124 serving as filter unit is set to a length where the outer diameter dimension of the filter member 124 is capable of being inscribed in the attachment hole 132. When the filter member 124 is press-fitted into the attachment hole 132, plural gaps 136 serving as vent portions are formed between the inner peripheral portion of the attachment hole 132 and the outer peripheral portion of the filter member 124. Even with this configuration, the same action as in the first embodiment can be provided and the same effects as in the first embodiment can be obtained.

(Eighth Modification)

Figure 13:
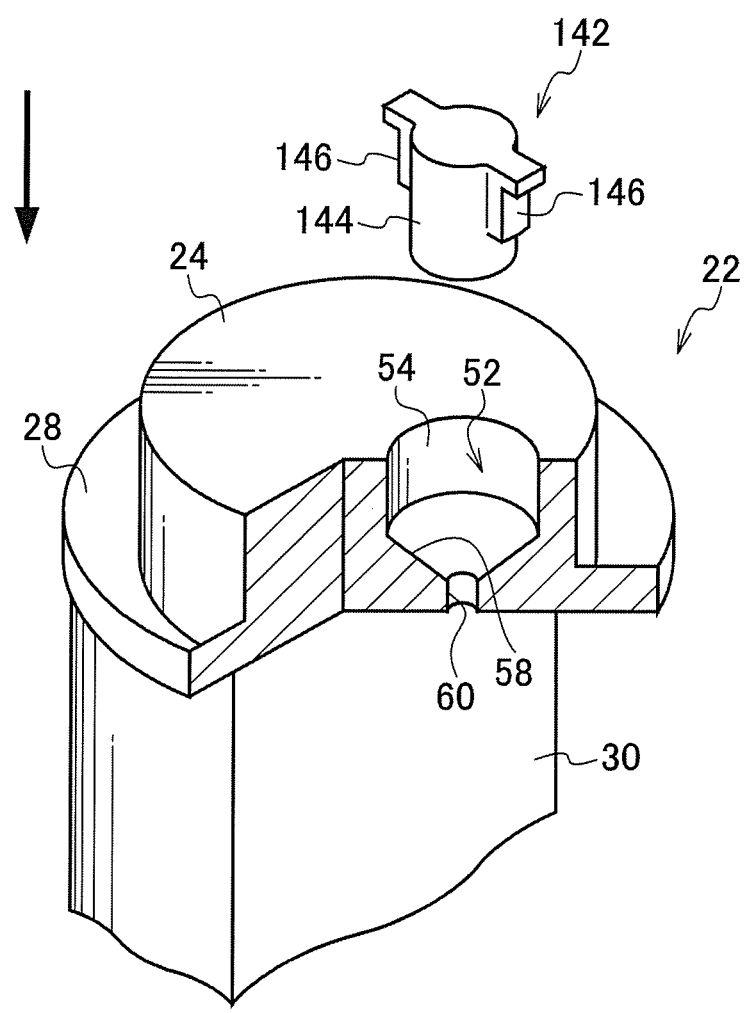
FIG. 13 is an enlarged exploded perspective view corresponding to FIG. 2 showing an eighth modification of the first embodiment.
Figure 14:
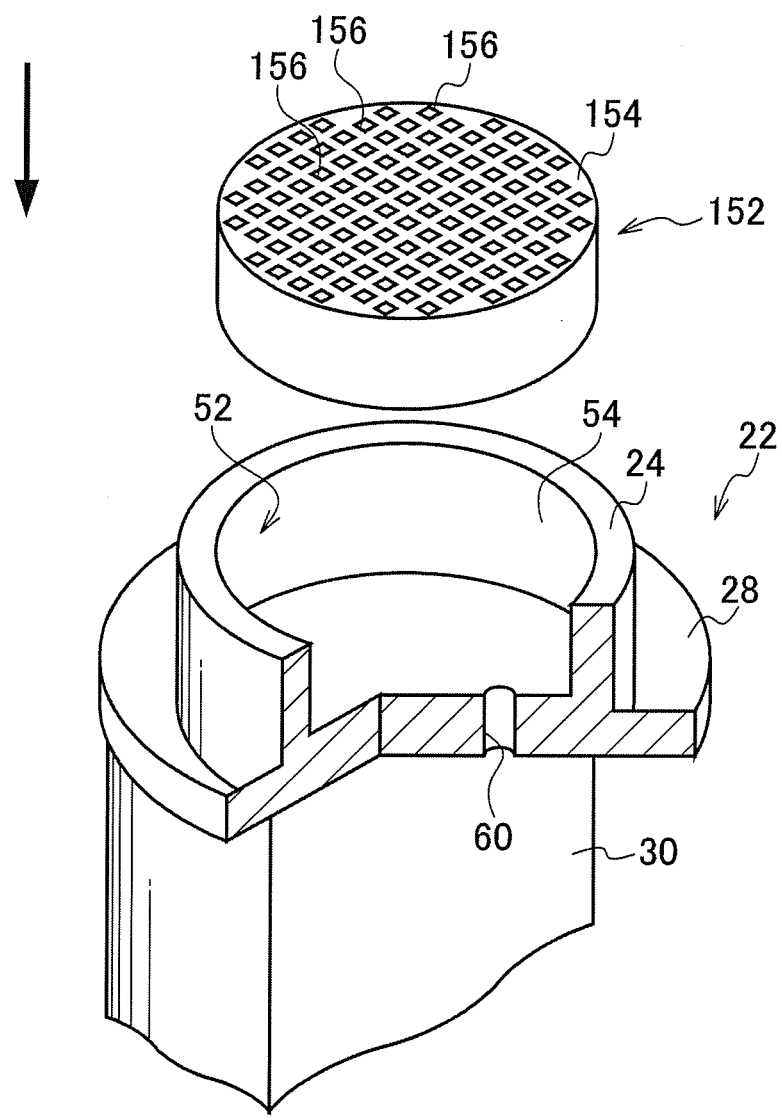
FIG. 14 is an enlarged exploded perspective view corresponding to FIG. 2 showing a ninth modification of the first embodiment.
Figure 15:
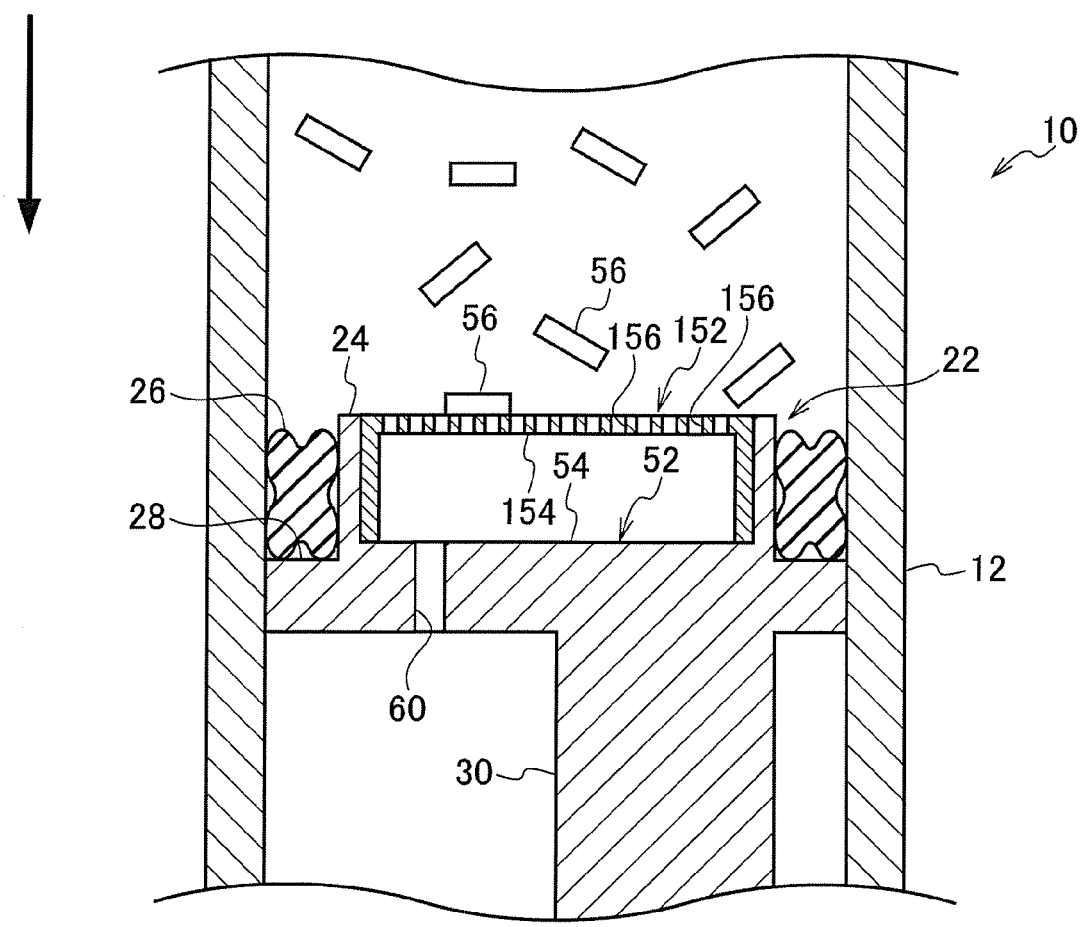
FIG. 15 is an enlarged side sectional view corresponding to FIG. 3 showing the ninth modification of the first embodiment.
Figure 16:
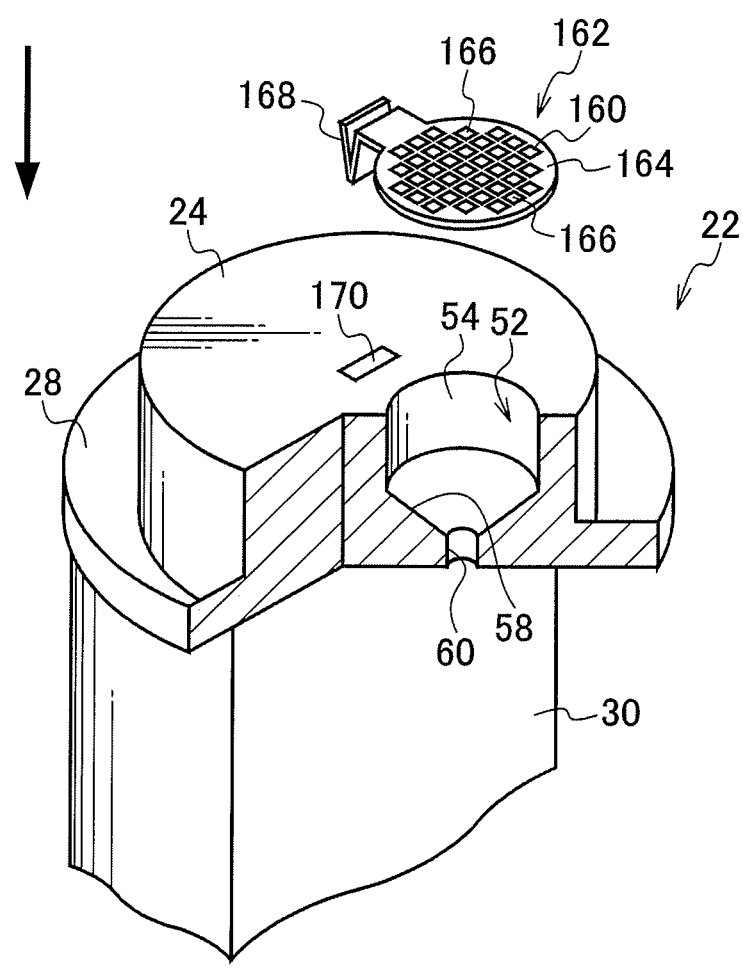
FIG. 16 is an enlarged exploded perspective view corresponding to FIG. 2 showing a tenth modification of the first embodiment.

Moreover, in an eighth modification of the present embodiment shown in FIG. 13, the pretensioner 10 is equipped with a filter member 142 serving as filter unit. The filter member 142 is equipped with a circular cylinder portion 144. The outer diameter dimension of the circular cylinder portion 144 is set sufficiently smaller than the inner diameter dimension of the attachment hole 54. On the upper side of the axial direction middle portion of the circular cylinder portion 144, a pair of pressing portions 146 project outward in the radial direction of the circular cylinder portion 144 from the outer peripheral portion of the circular cylinder portion 144. The pressing portions 146 are formed in such a way as to oppose each other with respect to the circular cylinder portion 144. The distance from the distal end of one of the pressing portions 146 to the distal end of the other of the pressing portions 146 along the radial direction of the circular cylinder portion 144 is substantially equal to the inner diameter dimension of the attachment hole 54.

For this reason, when the filter member 142 is attached to the attachment hole 54, the distal ends of both of the pressing portions 146 press against the inner peripheral portion of the attachment hole 54. Moreover, in this state, gaps serving as vent portions are formed between the circular cylinder portion 144 and the inner peripheral portion of the attachment hole 54. Even with this configuration, the same action as in the first embodiment can be provided and the same effects as in the first embodiment can be obtained.

(Ninth Modification)

Further, in the present embodiment, the filter member 62 serving as filter unit is formed in a circular column shape, but the configuration (shape) of the filter unit is not limited to such a shape. That is, in a ninth modification of the present embodiment shown in FIG. 14 and FIG. 15, a filter member 152 serving as filter unit is formed in a bottomed circular tube shape, with one end thereof being open. Additionally, numerous vent holes 156 serving as vent portions are formed in a bottom portion 154. The filter member 152 is press-fitted from its open end side into the attachment hole 54. Even with this configuration, the same action as in the first embodiment can be provided and the same effects as in the first embodiment can be obtained.

Moreover, because the filter member 152 has a circular tube shape, the bottom portion 154 is spaced apart from the bottom of the attachment hole 54 in a state where the filter member 152 has been press-fitted from its open end side into the attachment hole 54. For this reason, even if the regulation hole 58 is not disposed between the attachment hole 54 and the gas flow rate adjusting hole 60, the vent holes 156 formed in the bottom portion 154 do not become blocked by the bottom of the attachment hole 54.

(Tenth Modification)

Further, in the present embodiment, the pretensioner 10 has a configuration where the filter member 62 serving as filter unit is fixed to the piston 22 by press-fitting the filter member 62 into the attachment hole 54, but the structure for fixing the filter unit is not limited to this configuration.

That is, in a tenth modification of the present embodiment shown in FIG. 10, a filter member 162 serving as filter unit is equipped with a disc-shaped filter portion 164 whose outer peripheral shape is larger than the inner peripheral shape of the attachment hole 54. Numerous vent holes 166 serving as vent portions are penetratingly formed in the filter portion 164. A tabular fixing piece 168 extends from part of the outer periphery of the filter portion 164. The fixing piece 168 is bent at its extension direction middle portion into a substantial V shape.

A fixing hole 170 is formed in the piston body 24 in correspondence to the fixing piece 168. The fixing hole 170 is formed in a rectangular shape whose length dimension is substantially equal to the width dimension of the fixing piece 168 and whose width dimension is slightly larger than twice the thickness dimension of the fixing piece 168. When the fixing piece 168 is inserted into the fixing hole 170 until the filter portion 164 comes into contact with the end surface of the piston body 24, the filter member 162 becomes fixed to the piston 22 because of the elasticity of the fixing piece 168. Even with this configuration, the same action as in the first embodiment can be provided and the same effects as in the first embodiment can be obtained.

(Eleventh Modification)

Figure 17:
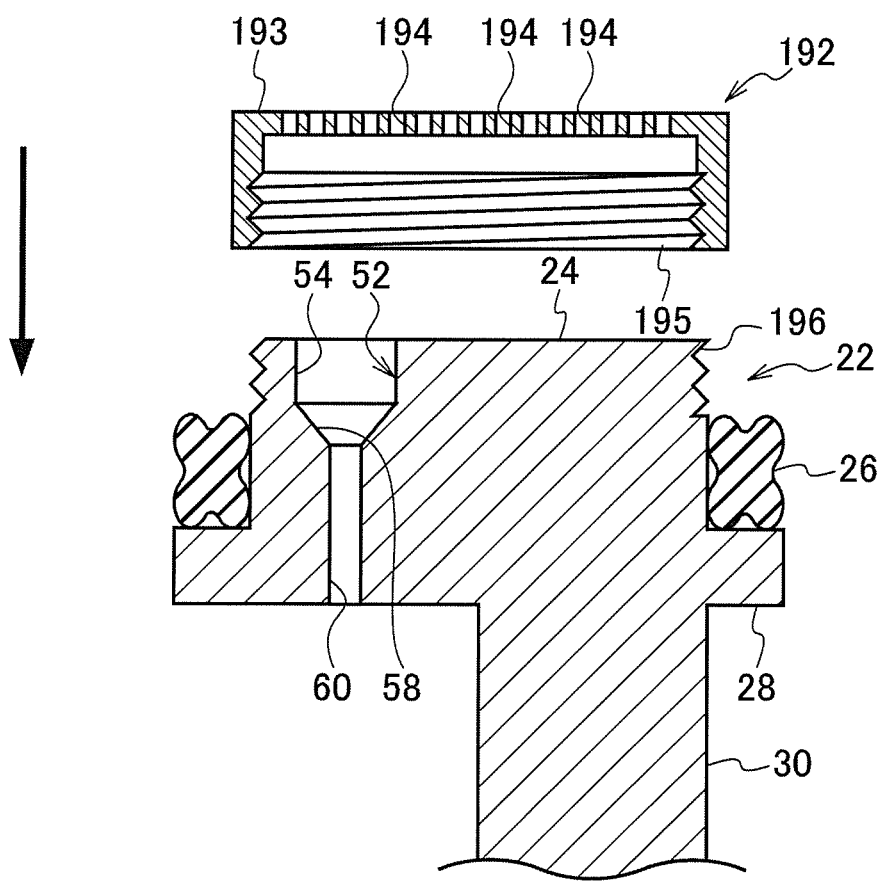
FIG. 17 is an enlarged side sectional view corresponding to FIG. 3 showing an eleventh modification of the first embodiment.

Further, in an eleventh modification of the present embodiment shown in FIG. 17, a filter member 192 serving as filter unit is formed in a bottomed circular tube shape that opens toward the piston 22 side. Numerous vent holes 194 serving as vent portions are formed in a bottom portion 193 of the filter member 192. A female screw 195 is formed on the inner peripheral portion of the filter member 192. When the female screw 195 is screwed onto a male screw 196 formed on the outer peripheral portion of the piston body 24, the filter member 192 becomes fixed to the piston 22 in a state where the bottom portion 193 is spaced apart from the end surface of the piston body 24. Even with this configuration, the same action as in the first embodiment can be provided and the same effects as in the first embodiment can be obtained.

It goes without saying that, in each of the above modifications, the formation conditions (open shape and formation range) of the configurations corresponding to the vent portions such as the vent holes 74 and 156, the grooves 84, and the gaps 94, 104, 126, and 136 follow the formation conditions (open shape and formation range) of the vent holes 74 in the first embodiment.

Configuration of Second Embodiment

Next, a second embodiment will be described.

Figure 2:
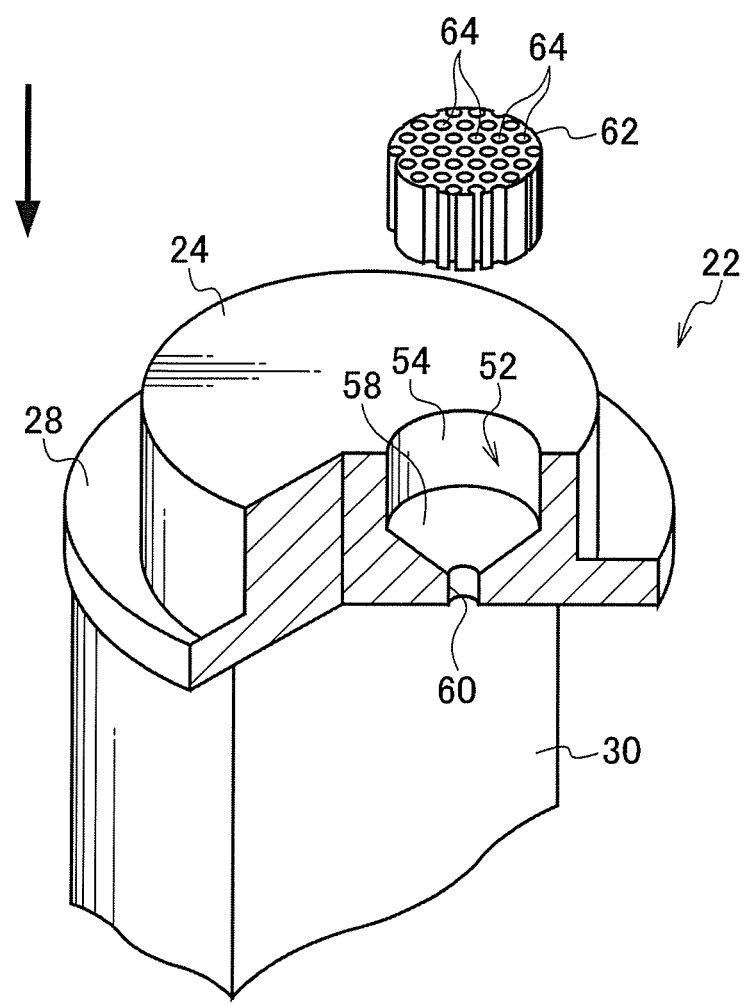
FIG. 2 is an enlarged exploded perspective view of configurations of relevant portions of the pretensioner pertaining to the first embodiment.
Figure 3:
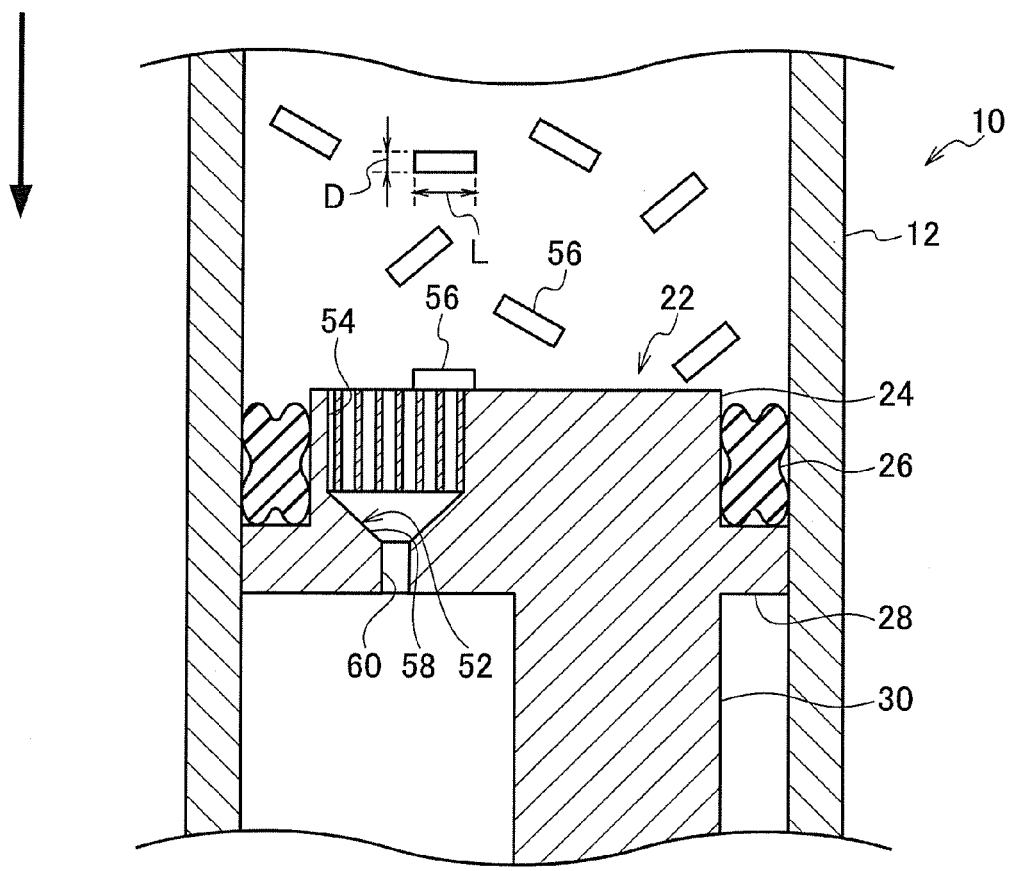
FIG. 3 is an enlarged side sectional view of configuration of relevant portions of the pretensioner pertaining to the first embodiment.
Figure 4:
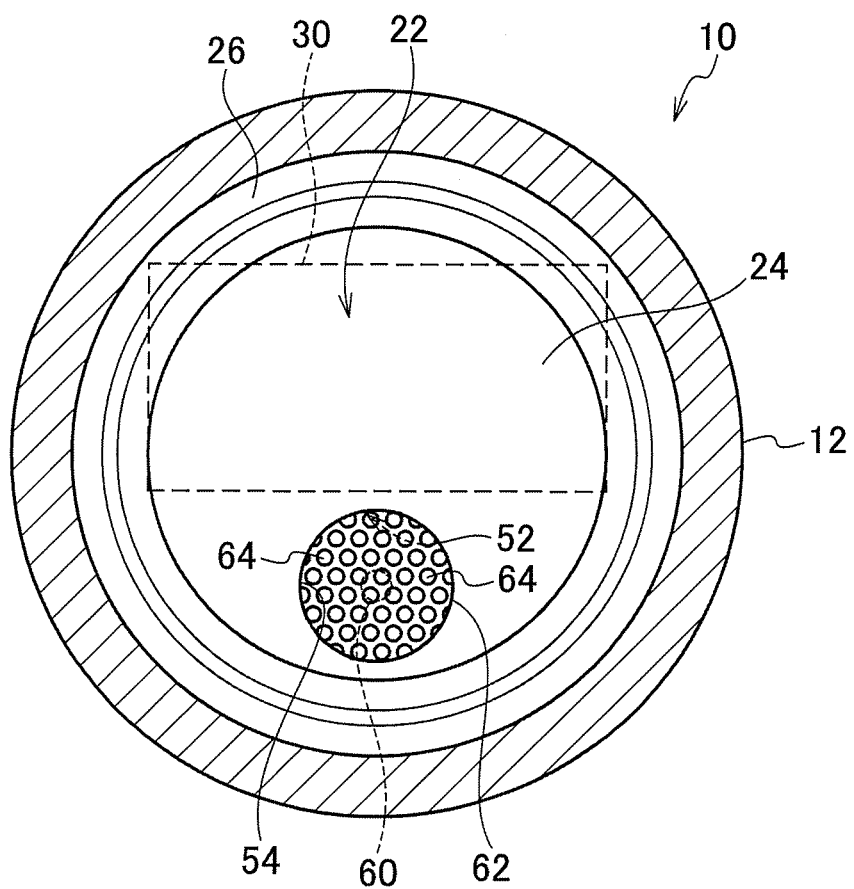
FIG. 4 is an enlarged plan sectional view of configurations of relevant portions of the pretensioner pertaining to the first embodiment.
Figure 5:
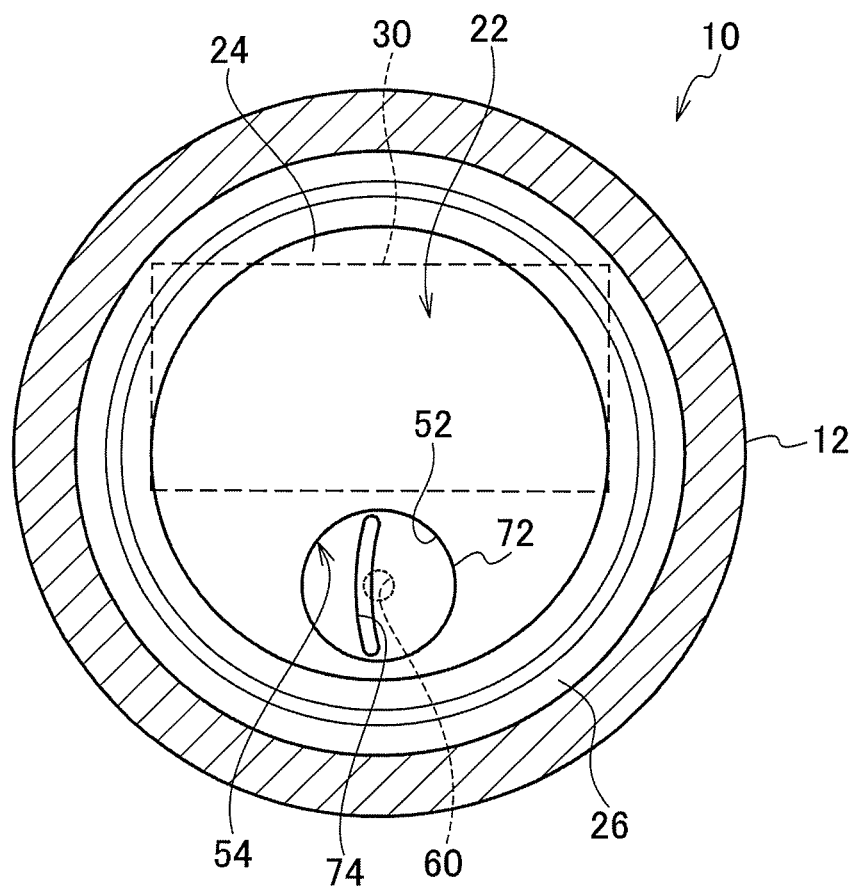
FIG. 5 is an enlarged plan sectional view corresponding to FIG. 4 showing a first modification of the first embodiment.
Figure 18:
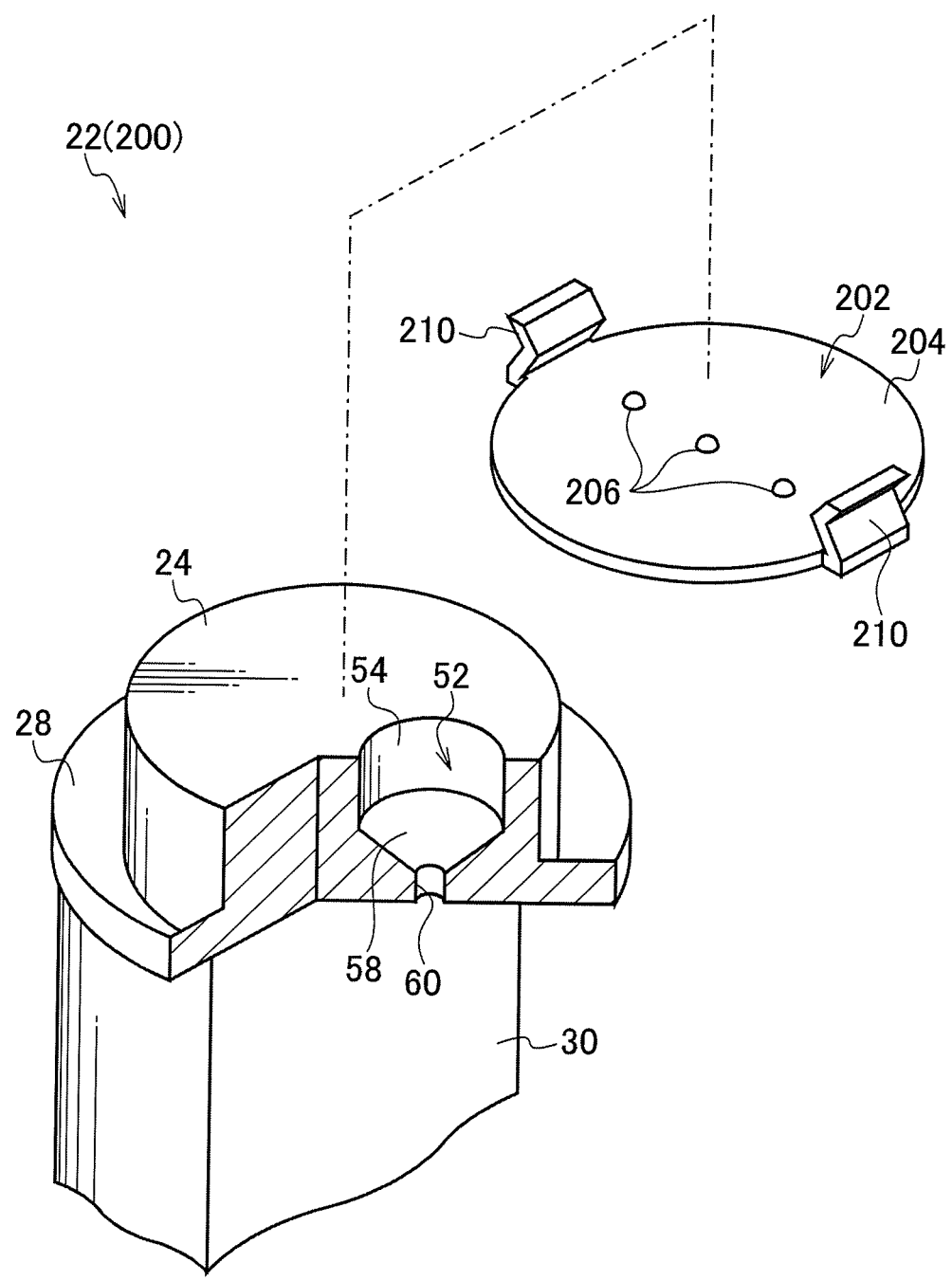
FIG. 18 is an enlarged exploded perspective view corresponding to FIG. 2 showing configurations of relevant portions of a pretensioner pertaining to a second embodiment.

In FIG. 18, configurations of relevant portions of a pretensioner 200 pertaining to the second embodiment are shown by way of an exploded perspective view corresponding to FIG. 2 that described the first embodiment. As shown in FIG. 18, the pretensioner 200 is equipped with a filter member 202 serving as filter unit. The filter member 202 is equipped with a disc-shaped portion 204. The disc portion 204 is formed in such a way that its outer diameter dimension is even larger than the larger of the inner diameter dimension of the attachment hole 54 and the maximum length of the maximum projected shape of the cinders 56 and is equal to or less than the outer diameter dimension of the piston body 24.

Figure 19:
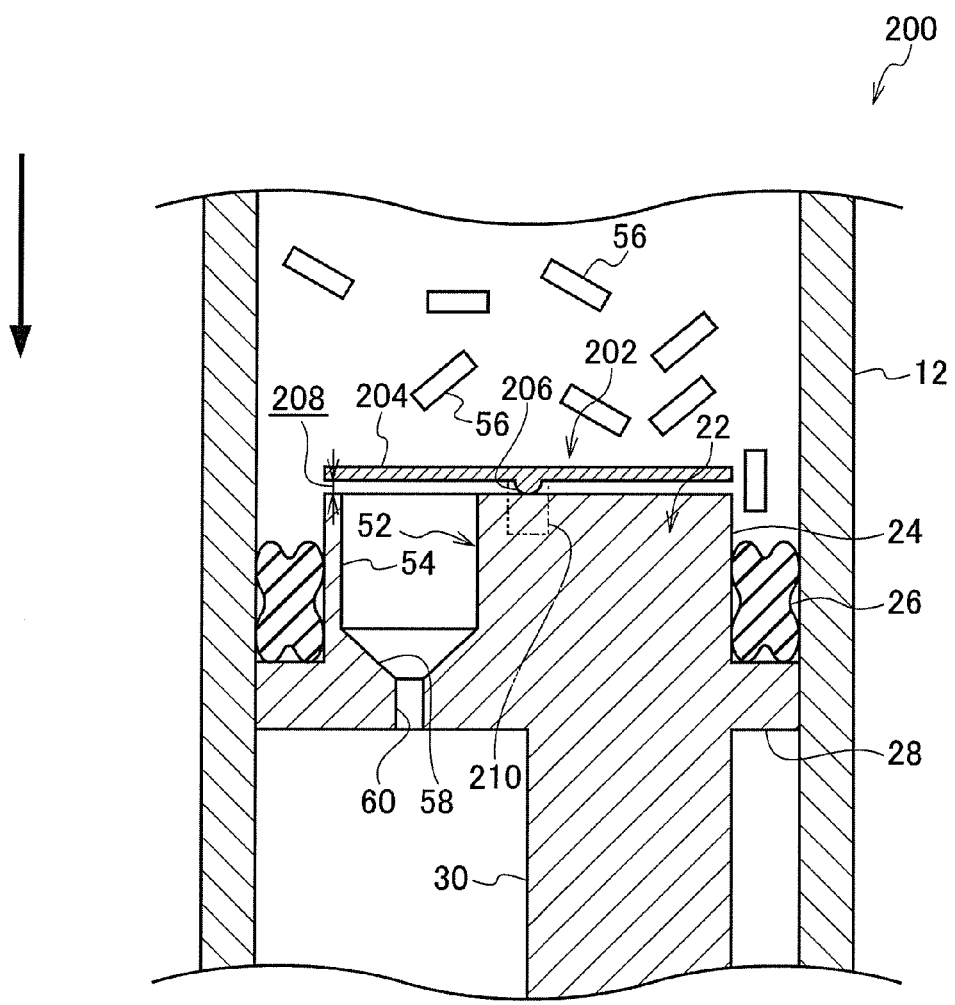
FIG. 19 is an enlarged side sectional view corresponding to FIG. 3 showing configurations of relevant portions of the pretensioner pertaining to the second embodiment.

One or plural projections 206 are formed on one thickness direction surface of the disc portion 204. As shown in FIG. 19, when the disc portion 204 is placed on the end surface of the piston body 24 in such a way that the projections 206 come into contact with the end surface of the piston body 24, a gap 208 serving as a vent portion is formed between the disc portion 204 and the end surface of the piston body 24. In a case where the open shape of the gap 208 and the cross-sectional shape of the gas flow rate adjusting hole 60 are seen superimposed in a plan view, the open shape of the gap 208 and the cross-sectional shape of the gas flow rate adjusting hole 60 do not coincide with each other. Moreover, because the outer peripheral shape of the disc portion 204 is larger than the cross-sectional shape of the gas flow rate adjusting hole 60, the setting range of the gap 208 becomes larger than the setting range of the gas flow rate adjusting hole 60.

Moreover, a pair of holding pieces 210 are formed on parts of the outer periphery of the disc portion 204. The holding pieces 210 are formed in such a way that one opposes the other via the disc portion 204. The holding pieces 210 extend toward the lower side of the cylinder 12 and are bent or curved at their extension direction middle portions in a substantial V shape inward in the radial direction of the disc portion 204. The interval between the bent portion of one of the holding pieces 210 and the bent portion of the other of the holding pieces 210 is set shorter than the outer diameter dimension of the piston body 24. In a state where the disc portion 204 has been placed on the end surface of the piston body 24 in such a way that the projections 206 come into contact with the end surface of the piston body 24, both of the holding pieces 210 elastically hold the outer peripheral portion of the piston body 24 on the upper side of the X-ring 26. Because of this, the filter member 202 is fixed to the piston 22.

Action and Effects of Second Embodiment

In the present embodiment, a vent hole that penetrates the disc portion 204 is not formed, so the gas that has been supplied to the inside of the cylinder 12 passes between the outer peripheral portion of the disc portion 204 and the outer peripheral portion of the piston body 24, flows in between the disc portion 204 and the end surface of the piston body 24, passes through the gas escape hole 52, and flows out to the lower side of the piston 22 and therefore the outer side of the cylinder 12.

Here, the open shape of the gap 208 and the cross-sectional shape of the gas flow rate adjusting hole 60 do not coincide with each other in a plan view. Moreover, as described above, the setting range of the gap 208 is larger than the setting range of the gas flow rate adjusting hole 60, so no matter which part of the gap 208 the cinders 56 catch on, there is a gap portion on which the cinders 56 do not catch. The difference between the open area of the gap 208 and the cross-sectional area of the gas flow rate adjusting hole 60 becomes smaller, but the gas with the flow rate decided by the cross-sectional area of the gas flow rate adjusting hole 60 can be released.

(First Modification)

In the present embodiment, the pretensioner 200 has a configuration where the disc portion 204 is spaced apart from the end surface of the piston body 24 and the filter member 202 is fixed to the piston 22 as a result of the pair of holding pieces 210 holding the outer peripheral portion of the piston body 24 in a state where the projections 206 have been brought into contact with the end surface of the piston body 24. However, the configuration by which the filter unit is fixed to the piston 22 in a state where the filter unit is spaced apart from the end surface of the piston body 24 is not limited to this configuration.

Figure 20:
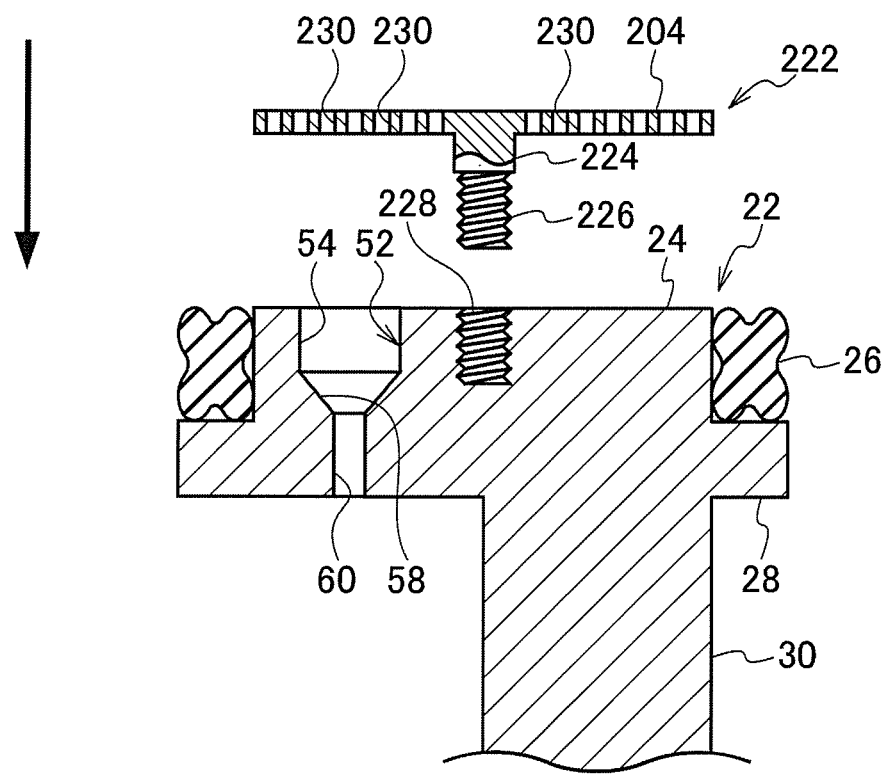
FIG. 20 is an enlarged side sectional view corresponding to FIG. 19 showing a first modification of the second embodiment.

That is, in a first modification of the present embodiment shown in FIG. 20, a circular cylinder-shaped boss 224 is formed coaxially with the disc portion 204 from the center of the end surface, on the piston body 24 side, of the disc portion 204 of a filter member 222 serving as filter unit. The height of the boss 224 (the axial direction length of the boss 224) is set to be same as the projecting dimension of the projections 206 as described above. A male screw 226 is formed coaxially with respect to the boss 224 from the end surface of the boss 224 on the piston body 24 side. A female screw 228 that opens at the end surface of the piston body 24 is formed on the central axis of the piston body 24 in correspondence to the male screw 226.

When the male screw 226 is screwed into the female screw 228 until the end portion of the boss 224 on the piston body 24 side comes into contact with the end surface of the piston body 24, the filter member 222 becomes fixed to the piston 22 in a state where the disc portion 204 is spaced apart from the end surface of the piston body 24. Moreover, because the axial direction length of the boss 224 is set to be the same as the projecting dimension of the projections 206, the interval of the gap (vent portion) between the disc portion 204 and the piston body 24 in a state where the filter member 222 has been fixed to the piston 22 becomes the same as that of the gap 208 in the second embodiment.

Consequently, even with this configuration, the same action as in the second embodiment can be provided and the same effects as in the second embodiment can be obtained. Further, in this modification, numerous vent holes 230 are penetratingly formed in the disc portion 204. The vent holes 230 are set like the vent holes 64 formed in the filter member 62 in the first embodiment, so in this modification also, the same action as in the first embodiment can be provided and the same effects as in the first embodiment can be obtained.

(Second Modification)

Figure 21:
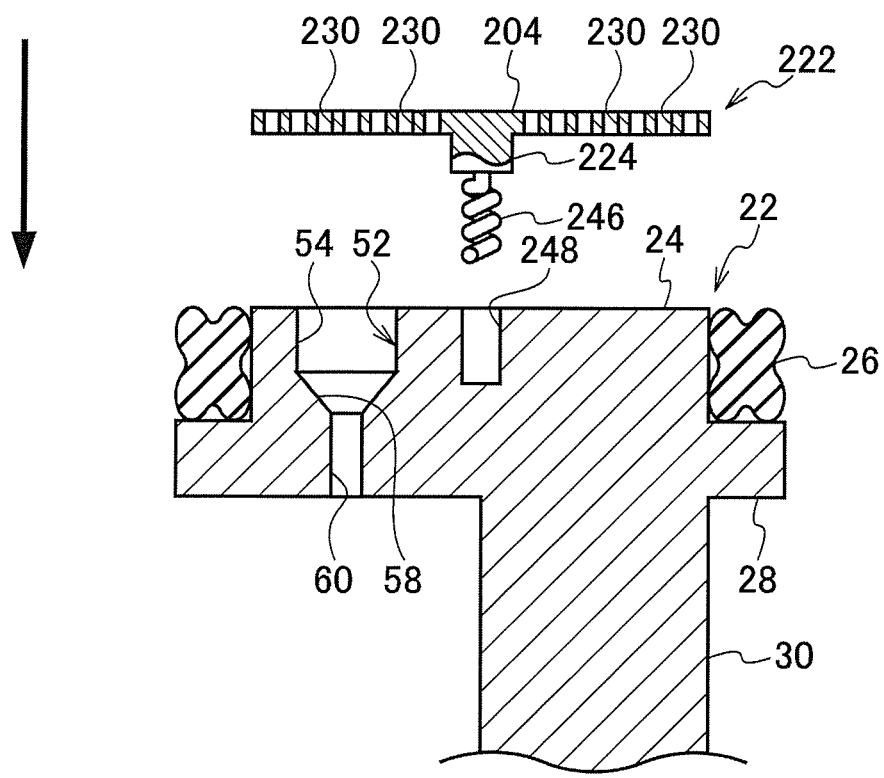
FIG. 21 is an enlarged side sectional view corresponding to FIG. 19 showing a second modification of the second embodiment.

Further, in a second modification of the present embodiment shown in FIG. 21, instead of the male screw 226, a coil spring 246 whose axial direction is along the axial direction of the boss 224 is disposed on the end portion of the boss 224 on the piston body 24 side. And instead of the female screw 228, a circular hole 248 that opens at the end surface of the piston body 24 is formed coaxially with respect to the piston body 24 on the central axis of the piston body 24. When the coil spring 246 is press-fitted into the circular hole 248 counter to the elasticity of the coil spring 246 until the end portion of the boss 224 on the piston body 24 side comes into contact with the end surface of the piston body 24, the filter member 222 becomes fixed to the piston 22 in a state where the disc portion 204 is spaced apart from the end surface of the piston body 24. Consequently, even with this configuration, the same action as in the first modification of the present embodiment can be provided and the same effects as in the first modification of the embodiment can be obtained.

Configuration of Third Embodiment

Next, a third embodiment will be described.

Figure 22:
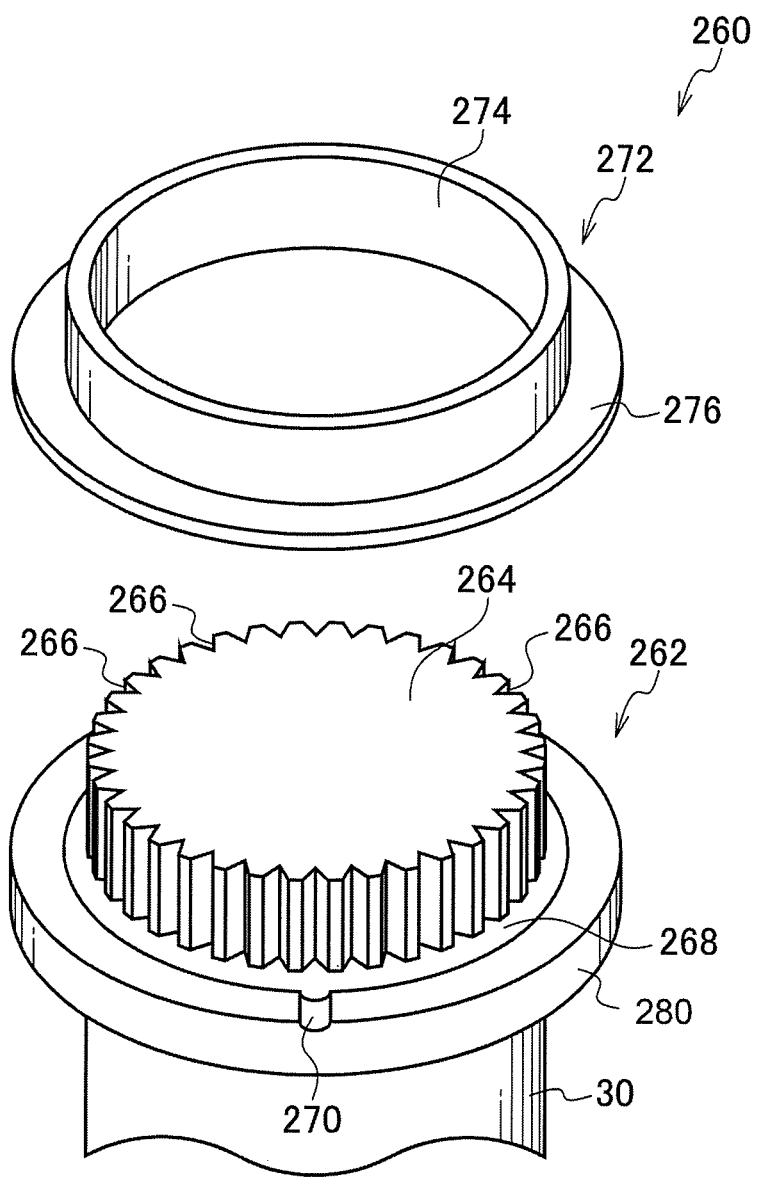
FIG. 22 is an enlarged exploded perspective view corresponding to FIG. 2 showing configurations of relevant portions of a pretensioner pertaining to a third embodiment.

In FIG. 22, configurations of relevant portions of a pretensioner 260 pertaining to the third embodiment are shown by way of an exploded perspective view corresponding to FIG. 2 that described the first embodiment. As shown in FIG. 22, the pretensioner 260 is equipped with a piston 262 serving as a spool driving member instead of the piston 22. The piston 262 is equipped with a piston body 264 that configures a filter member. The piston body 264 has a shape where grooves 266 serving as vent portions that open at both axial direction ends of the piston body 264 are formed every predetermined interval in the circumferential direction of a circular cylinder shape like the piston body 24. In other word, the grooves 266 are formed at the outer peripheral portion of the piston body 264.

Further, an annular groove 268 is formed in the surface of a flange portion 280 on the piston body 264 side. The annular groove 268 has a ring-like shape along the outer peripheral portion of the piston body 264. All of the grooves 266 are communicated, at their end portions on the flange portion 280 side, with the annular groove 268. Further, a gas flow rate adjusting groove 270 serving as a gas flow rate adjusting portion is formed in the surface of the flange portion 280 on the piston body 264 side. The gas flow rate adjusting groove 270 is formed in such a way that its lengthwise direction is along the radial direction of the flange portion 280. One end of the gas flow rate adjusting groove 270 is communicated with the annular groove 268, and the other end of the gas flow rate adjusting groove 270 opens at the outer peripheral portion o the flange portion 280. The area of the cross section of the gas flow rate adjusting groove 270 when the gas flow rate adjusting groove 270 is cut in a direction orthogonal to its lengthwise direction is set on the basis of the flow rate of the gas to be passed through the gas flow rate adjusting groove 270 per unit of time in a case where the internal pressure inside the cylinder 12 between the gas generator 20 and the piston 262 is a predetermined value.

Here, the shape of the gas flow rate adjusting groove 270 that opens at part of the outer peripheral portion of the flange portion 280 (the open shape at the outer peripheral portion of the flange portion 280) and the open shapes of the grooves 266 are set in such a way that they are offset from and do not coincide with each other in a plan view. Moreover, the range of the open shape of the gas flow rate adjusting groove 270 is narrower than the setting range of the grooves 266 along the outer peripheral portion of the piston body 264, and the open area of the gas flow rate adjusting groove 270 is smaller than the sum total of the open areas of all of the grooves 266 on the piston body 264 end surface side.

Further, a sleeve 272 serving an annular member that configures filter unit together with the piston body 264 is attached to the piston 262. The sleeve 272 is equipped with a tubular portion 274. The tubular portion 274 is formed in a circular tube shape whose inner diameter dimension is equal to the outer diameter dimension of the circular cylinder-shaped piston body 264 in a case where the grooves 266 are not formed in the piston body 264. An outer diameter dimension of the tubular portion 274 is shorter than the inner diameter dimension of the cylinder 12, and whose axial direction is along the axial direction of the cylinder 12. A flange portion 276 projects outward in the radial direction of the tubular portion 274 from the axial direction lower end portion of the tubular portion 274.

Figure 23:
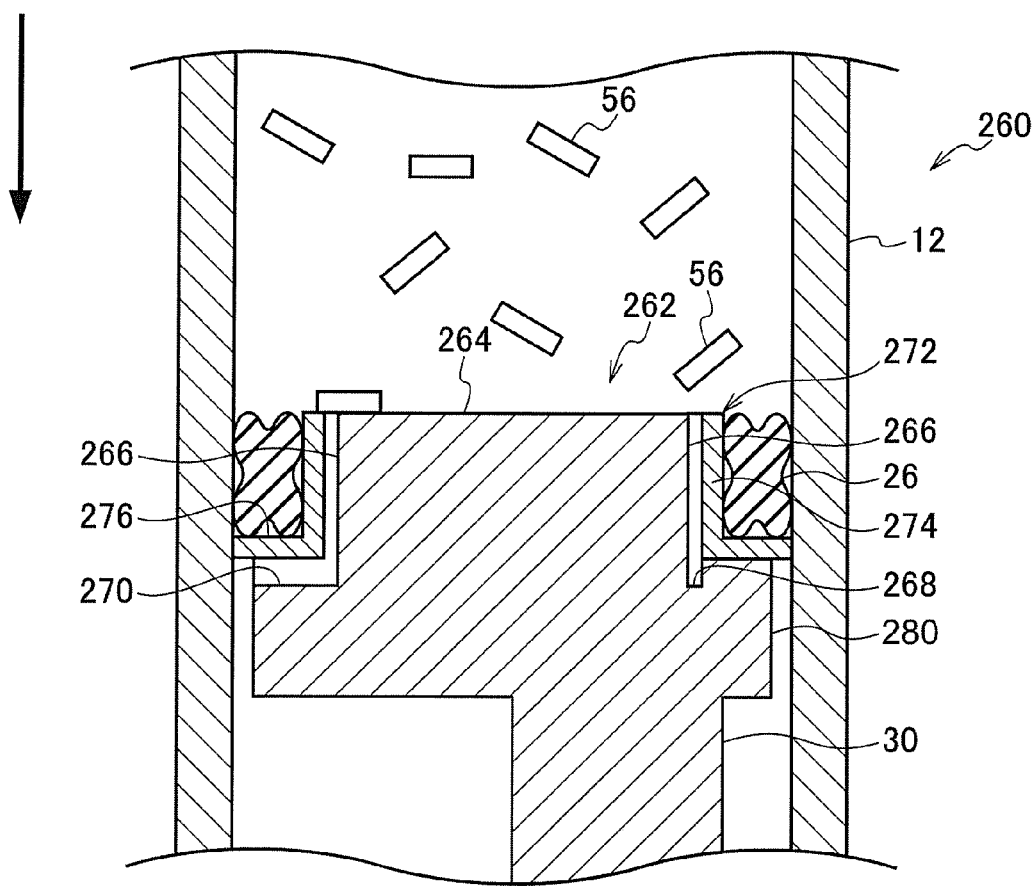
FIG. 23 is an enlarged side sectional view corresponding to FIG. 3 showing configurations of relevant portions of the pretensioner pertaining to the third embodiment.

The outer diameter dimension of the flange portion 276 is shorter than the inner diameter dimension of the cylinder 12 and, particularly in the present embodiment, is substantially equal to the outer diameter dimension of the flange portion 280 of the piston 262. As shown in FIG. 23, the sleeve 272 is attached to the piston 262 by inserting the piston body 264 into the inner side of the tubular portion 274 so that the end surface of the flange portion 276 is brought into contact with the flange portion 280. The openings of the grooves 266 on the piston body 264 outer peripheral portion side become closed by the tubular portion 274, and the opening of the annular groove 268 and the opening of the gas flow rate adjusting groove 270 on the flange portion 280 end surface side become closed by the flange portion 276.

Action and Effects of Third Embodiment

According to the pretensioner 260, the gas that has been generated by the gas generator 20 passes through the grooves 266 formed in the outer peripheral portion of the piston body 264 and reaches the annular groove 268. The gas passes through the inside of the annular groove 268, reaches the gas flow rate adjusting groove 270, passes through the gas flow rate adjusting groove 270, escapes to the outer side of the flange portion 280, passes between the outer peripheral portion of the flange portion 280 and the inner peripheral portion of the cylinder 12, and is released to the lower side of the piston 262. In this way, although the gas passage path differs, in the present embodiment also the gas can escape like in the first embodiment, so after the pretensioner 260 has been actuated, the internal pressure inside the cylinder 12 on the upper side of the piston 262 is not maintained in a high state.

Further, also when the piston 262 is sliding because of the rise in the internal pressure inside the cylinder 12, the gas passes and escapes through the grooves 266, the annular groove 268, and the gas flow rate adjusting groove 270. However, the quantity of the gas that passes through the grooves 266, the annular groove 268, and the gas flow rate adjusting groove 270 in this state is decided by the cross-sectional area of the gas flow rate adjusting groove 270, and the cross-sectional area of the gas flow rate adjusting groove 270—and therefore the gas passage quantity—is set in such a way that there is no hindrance with respect to the descent of the piston 262 and the rack bar 30 causing the pinion 34 to rotate in the retraction direction. Consequently, the gas escapes also when the piston 262 is sliding because of the rise in the internal pressure inside the cylinder 22, but the piston 262 can be sufficiently lowered and the pinion 34—and therefore the spool 38—can be caused to rotate in the retraction direction.

Moreover, the open shapes of the grooves 266 and the open shape of the gas flow rate adjusting groove 270 are set in such a way that the shape of the gas flow rate adjusting groove 270 that opens at part of the outer peripheral portion of the flange portion 280 (the open shape at the outer peripheral portion of the flange portion 280) and the open shapes of the grooves 266 are offset from and do not coincide with each other. The range of the open shape of the gas flow rate adjusting groove 270 is narrower than the setting range of the grooves 266 along the outer peripheral portion of the piston body 264. For this reason, even if any of the grooves 266 become blocked by the cinders 56, the other grooves 266 are open, so the gas can flow through the grooves 266 not blocked by the cinders 256.

Moreover, the sum total of the open areas of the grooves 266 at the end surface of the piston body 264 is larger than the cross-sectional area of the gas flow rate adjusting groove 270, so even if any of the grooves 266 becomes blocked by the cinders 56, the difference between the sum total of the open areas of the other grooves 266 and the cross-sectional area of the gas flow rate adjusting groove 270 becomes smaller, but a sufficient gas passage quantity corresponding to the size of the cross-sectional area of the gas flow rate adjusting groove 270 can be ensured.

(First Modification)

In the present embodiment, the pretensioner 260 has a configuration where the plural grooves 266 are formed in the outer peripheral portion of the piston body 264, but the number of the grooves 266 formed in the outer peripheral portion of the piston body 264 is in no way limited. Further, in the present embodiment, the grooves 266 have a configuration where they are communicated with the outer side of the outer peripheral portion of the flange portion 280 via the annular groove 268 and the gas flow rate adjusting groove 270 and where they are communicated with the lower side of the piston 262 via the space between the outer peripheral portion of the flange portion 280 and the inner peripheral portion of the cylinder 12, but it suffices for the grooves 266 to eventually be communicated with the lower side of the piston 262, and the gas passage path is in no way limited. Moreover, in the present embodiment, the sleeve 272 is used as the annular member. However, the configuration of the annular member is not limited to the sleeve 272.

Figure 24:
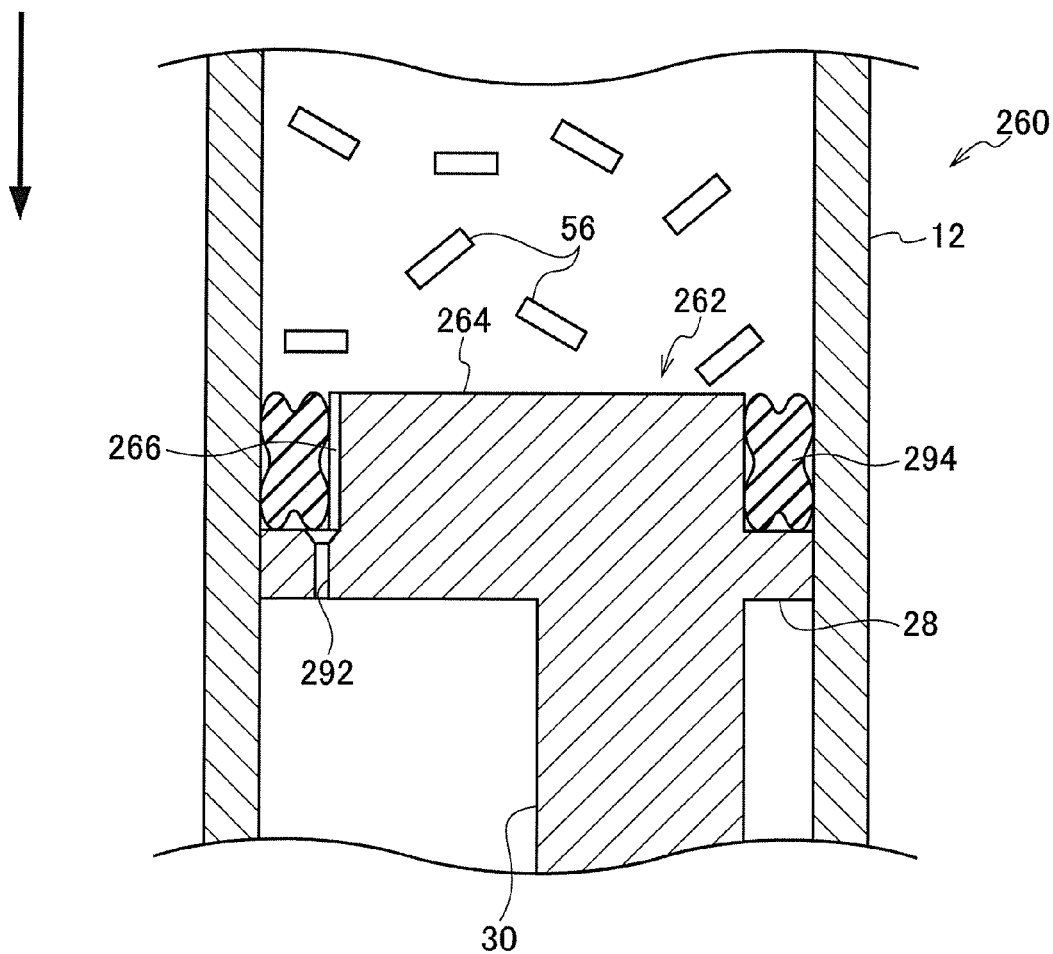
FIG. 24 is an enlarged side sectional view corresponding to FIG. 23 showing a first modification of the third embodiment.
Figure 25A:
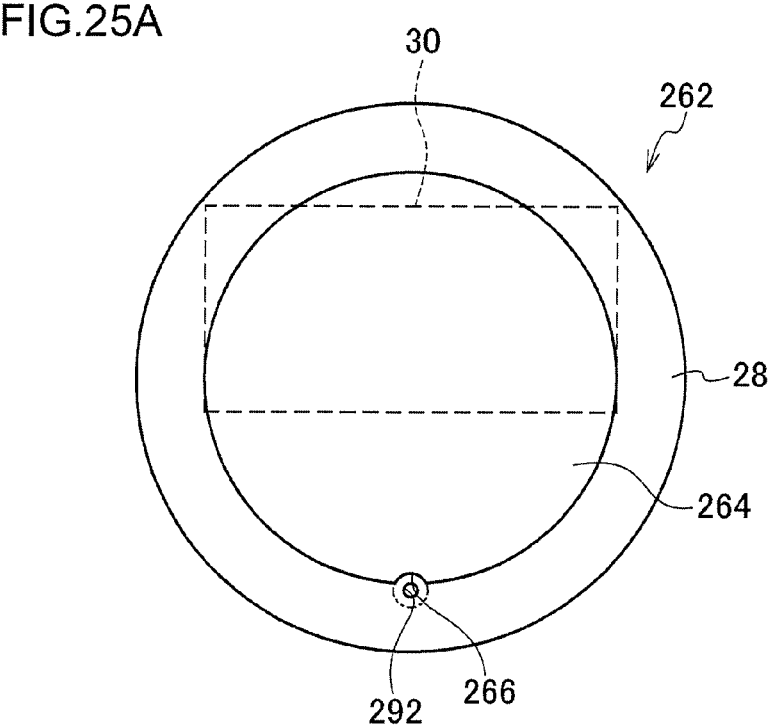
FIG. 25A and FIG. 25B are enlarged plan sectional views showing the first modification of the third embodiment.
Figure 25B:
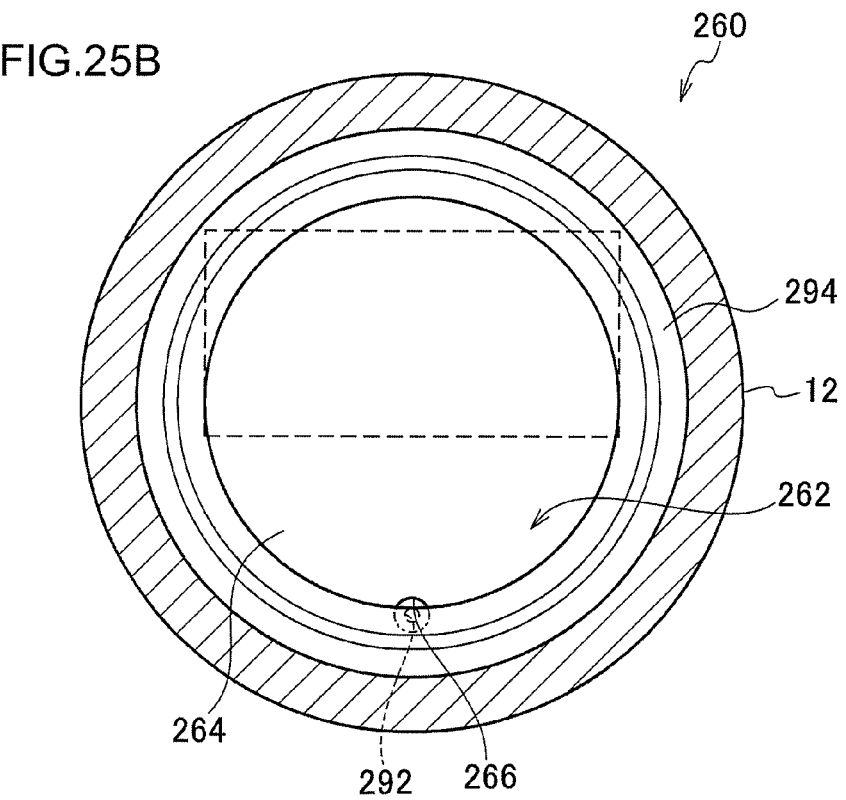

That is, according to a first modification of the present embodiment shown in FIG. 24, FIG. 25A, and FIG. 25B, a single groove 266 is formed in the outer peripheral portion of the piston body 264. Further, in this first modification, the annular groove 268 and the gas flow rate adjusting groove 270 are not formed; instead, a gas flow rate adjusting hole 292 serving as a gas flow rate adjusting portion is formed. The gas flow rate adjusting hole 292 is formed as a through hole whose one end opens, on the side of the piston body 264, at the end surface of the flange portion 280 on the piston body 264 side and whose other end opens at the end surface of the flange portion 280 on the side opposite the piston body 264 side. The cross-sectional shape of the gas flow rate adjusting hole 292 is circular, and as for the cross-sectional area, the open shape is, like the gas flow rate adjusting hole 60 in the first embodiment, set on the basis of the flow rate of the gas to be passed through the gas flow rate adjusting hole 292 per unit of time in a case where the internal pressure inside the cylinder 12 between the gas generator 20 and the piston 262 is a predetermined value.

As shown in FIG. 25A and FIG. 25B, the groove 266 in the present modification has a configuration where it curves in a larger radius of curvature than the radial dimension of the gas flow rate adjusting hole 292 taking the central axis of the gas flow rate adjusting hole 292 as the center of curvature. The shape of the groove 266 is not limited to this shape. Moreover, a gas passage path resulting from the groove 266 and the gas flow rate adjusting hole 292 is configured by attaching to the piston body 264 an X-ring 294 serving as an annular member whose configuration is basically the same as that of the X-ring 26 heretofore described.

Configuration of Fourth Embodiment

Next, a fourth embodiment will be described.

Figure 26:
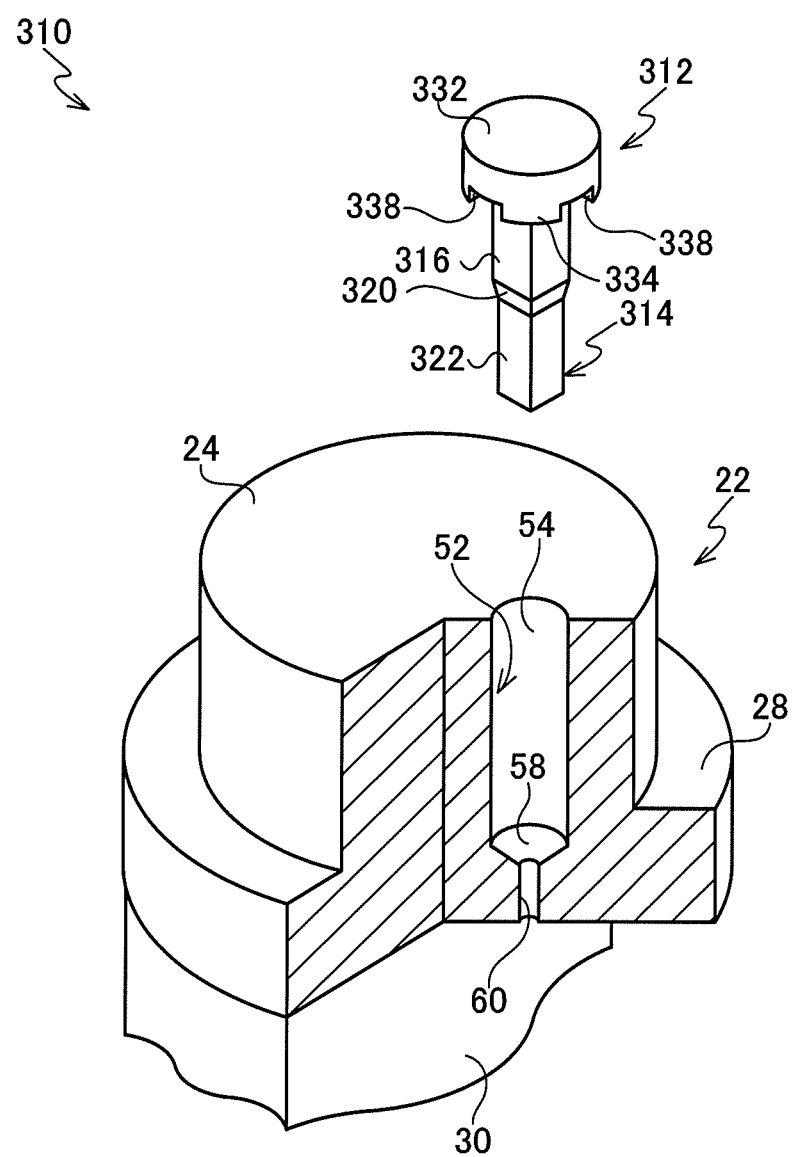
FIG. 26 is an enlarged exploded perspective view corresponding to FIG. 2 showing configurations of relevant portions of a pretensioner pertaining to a fourth embodiment.
Figure 27:
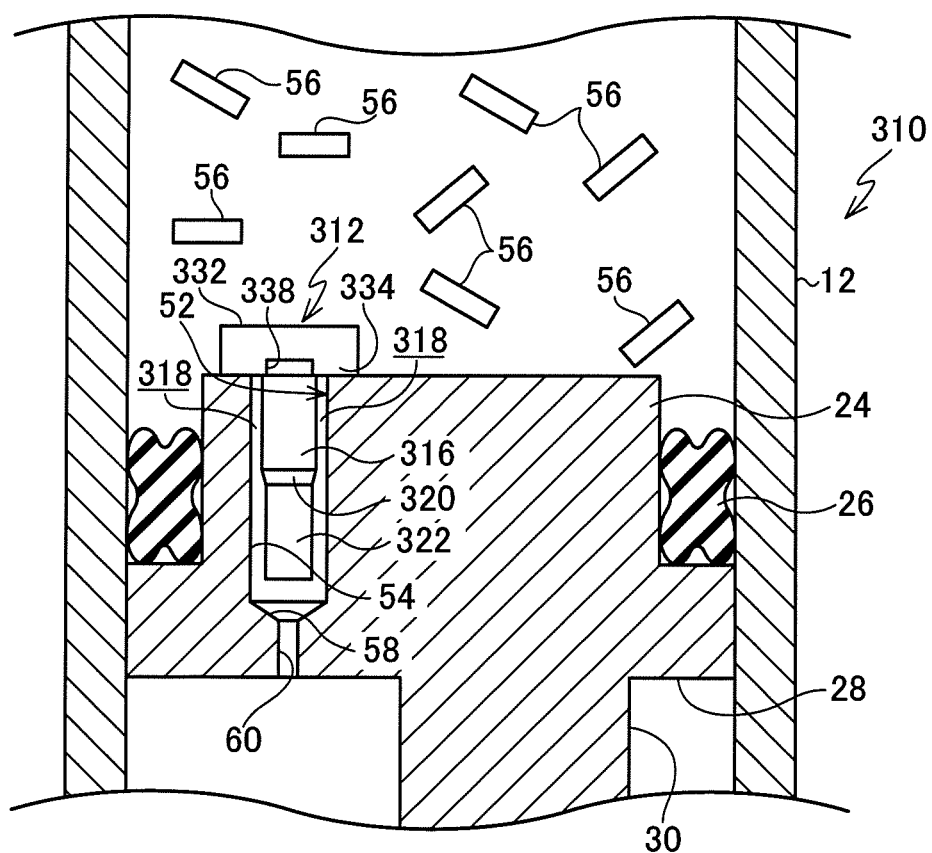
FIG. 27 is an enlarged side sectional view corresponding to FIG. 3 showing configurations of relevant portions of the pretensioner pertaining to the fourth embodiment.

In FIG. 26, an exploded perspective view in which relevant portions of a pretensioner 310 pertaining to the present embodiment are enlarged is shown. In FIG. 27, a side sectional view in which relevant portions of the pretensioner 310 are enlarged is shown. Moreover, in FIG. 28, a plan sectional view in which relevant portions of the pretensioner 310 are enlarged is shown. The one-dot chain line circle B in FIG. 28 is an enlarged view of the inside of the one-dot chain line circle A in FIG. 8.

Figure 28:
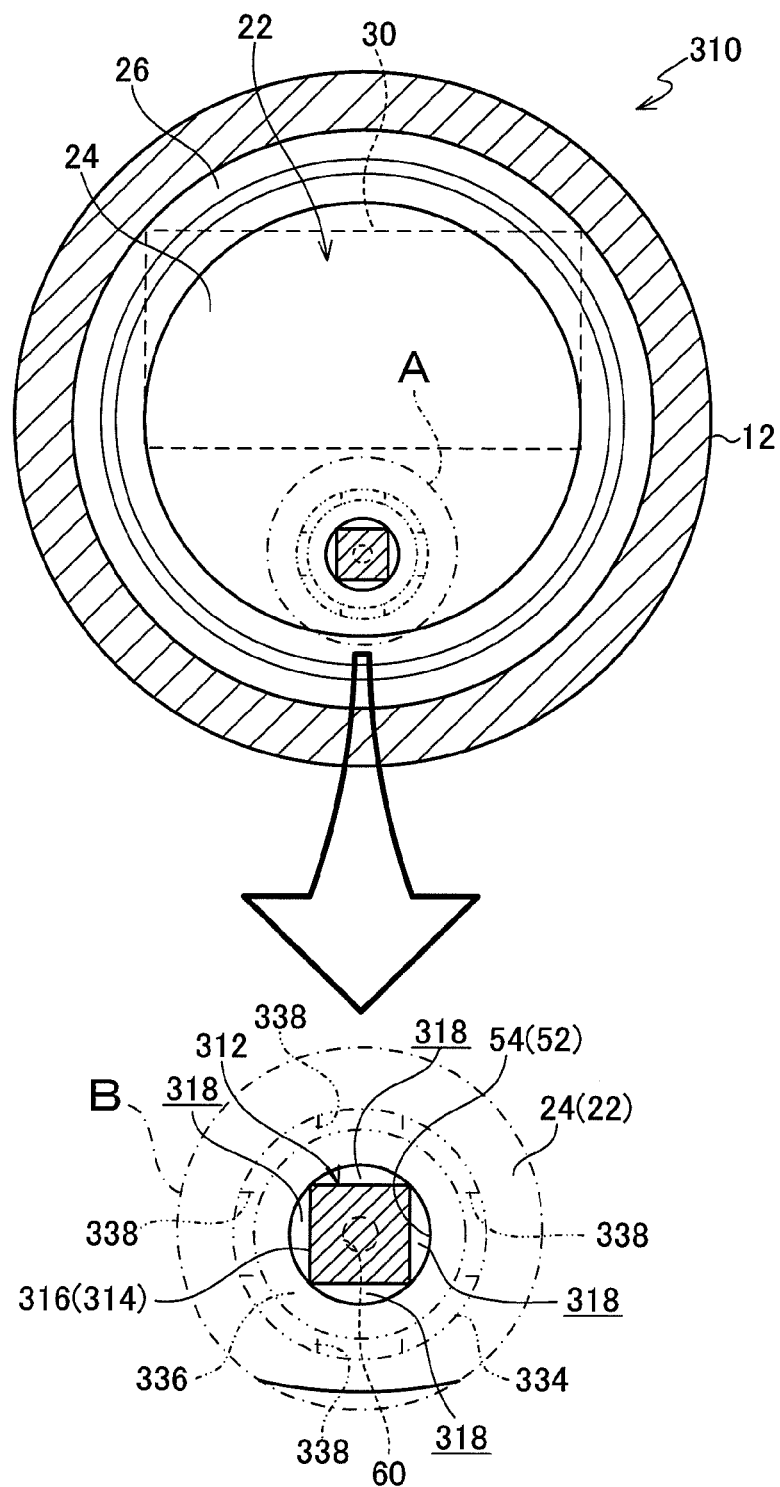
FIG. 28 is an enlarged plan sectional view corresponding to FIG. 4 showing configurations of relevant portions of the pretensioner pertaining to the fourth embodiment.
Figure 29:
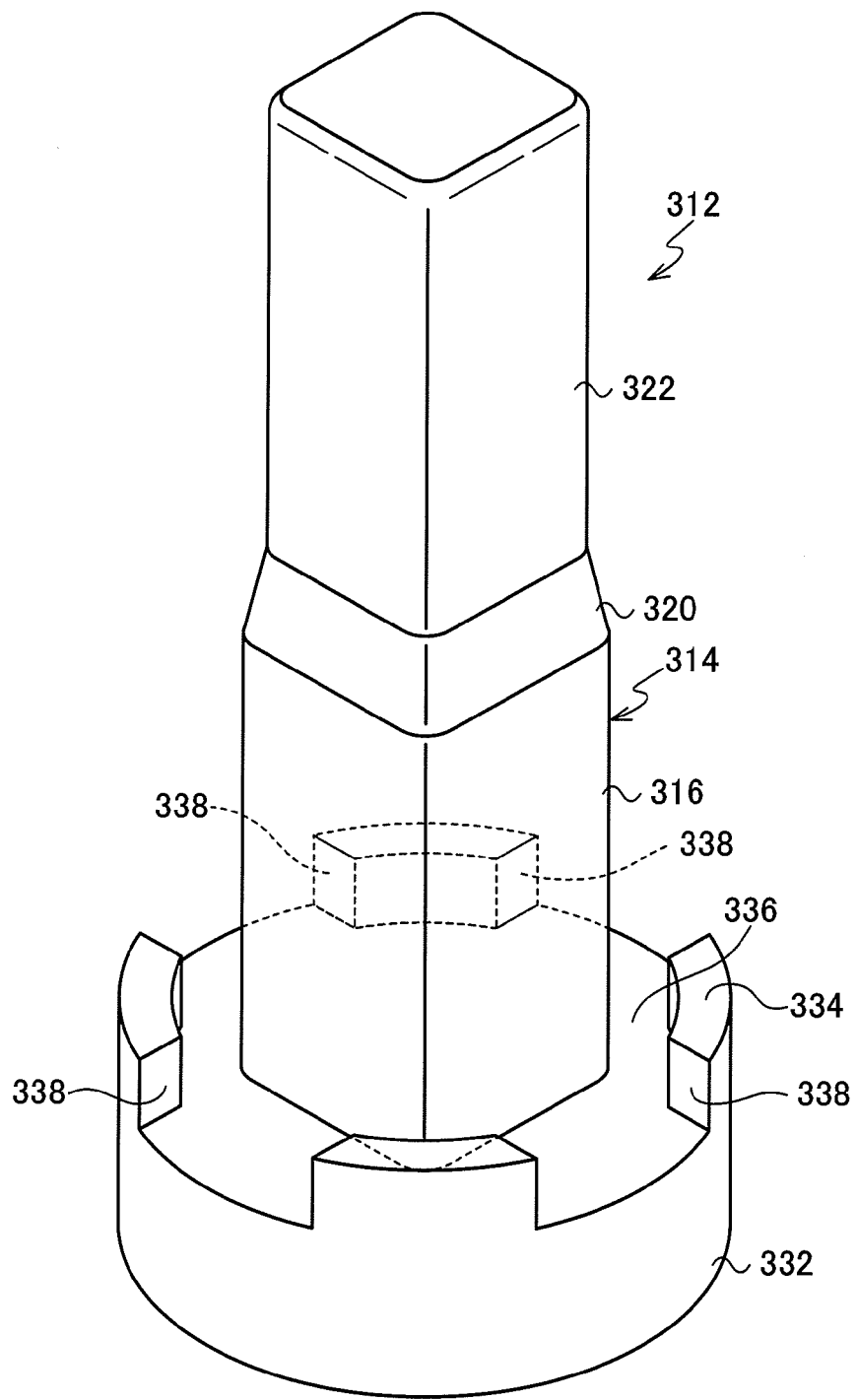
FIG. 29 is a perspective view of a plug serving as filter unit in the fourth embodiment.

As shown in FIG. 26, FIG. 27, and FIG. 28, a plug 312 serving as a filter unit is attached from the attachment hole 54 side to the gas escape hole 52 formed in the piston 22 of the pretensioner 310. As shown in FIG. 26 and FIG. 29, the plug 312 is equipped with an insertion portion 314. The insertion portion 314 is equipped with an insertion portion body 316. The outer peripheral shape of the insertion portion body 316 is formed in a rectangle that is one form of a polygon and particularly in the present embodiment, a square. The outer peripheral shape of the insertion portion body 316 differs from the inner peripheral shape of the attachment hole 54 that is formed in a circle.

As shown in FIG. 28, the length of the diagonal lines in the cross-sectional shape of the insertion portion body 316 is set equal to (strictly speaking, slightly smaller than) the diameter dimension of the inner peripheral portion of the attachment hole 54. In a state where the insertion portion body 316 has been inserted into the inner side of the attachment hole 54, the corner portions (four corners) of the outer peripheral portion of the insertion portion body 316 come into contact with the inner peripheral portion of the attachment hole 54, and the outer peripheral surface of the insertion portion body 316 excluding the corner portions are positioned further on the inner side of the inner peripheral portion of the attachment hole 54. For this reason, between the inner peripheral surface of the attachment hole 54 and the outer peripheral surface of the insertion portion body 316 excluding the corner portions, gaps 318 serving as vent portions such as shown in FIG. 27 and FIG. 28 are formed along the penetration direction of the attachment hole 54. That is, in the present embodiment, it can also be said that the insertion portion body 316 of the plug 312 substantially configures the filter unit.

The maximum open width of the gaps 318—that is, the interval between the inner peripheral portion of the attachment hole 54 and the outer peripheral portion of the insertion portion body 316 at the portions where the inner peripheral portion of the attachment hole 54 and the outer peripheral portion of the insertion portion body 316 are furthest apart from each other—is from 0.1 mm to 0.3 mm, and is specifically set about 0.2 mm. The gaps 318 whose open width is set to this size have a lengthwise direction dimension that is set larger than the diameter dimension of the inner peripheral portion of the gas flow rate adjusting hole 60 and have a maximum width dimension (the above-described maximum open width dimension) that is set smaller than the diameter dimension of the inner peripheral portion of the gas flow rate adjusting hole 60. For this reason, when the open shapes of the individual gaps 318 and the open shape of the gas flow rate adjusting hole 60 are seen superimposed in a plan view, the open shape of the gas flow rate adjusting hole 60 does not coincide with the open shapes of the gaps 318. Further, the sum total of the open areas of all of the gaps 318 becomes larger than the open area of the gas flow rate adjusting hole 60.

As shown in FIG. 26 and FIG. 29, a tapered portion 320 is formed continuously from one lengthwise direction end of the insertion portion body 316. The end portion of the tapered portion 320 on the insertion portion body 316 side has the same shape as the cross-sectional shape of the insertion portion body 316. However, the outer peripheral shape of the tapered portion 320 gradually becomes smaller toward the side opposite the insertion portion body 316 side so as to have a tapered shape. A small diameter portion 322 is formed continuously from the end portion of the tapered portion 320 on the side opposite the insertion portion body 316 side. The length from the one end of the small diameter portion 322 (the end portion of the small diameter portion 322 on the side opposite the tapered portion 320 side) to the end of the insertion portion body 316 (the end portion of the insertion portion body 316 on the side opposite the tapered portion 320 side) is equal to or less than the depth dimension of the attachment hole 54 in the gas escape hole 52.

Further, the length of the diagonal lines in the cross section of the small diameter portion 322 is shorter than the diameter dimension of the inner peripheral portion of the attachment hole 54. For this reason, in a state where the insertion portion body 316 has been inserted into the inside of the attachment hole 54, the corner portions (four corners) of the small diameter portion 322 are spaced apart from the inner peripheral portion of the attachment hole 54. In the present embodiment, the tapered portion 320 and the small diameter portion 322 have similar shapes with respect to the insertion portion body 316, but it is alright if the outer peripheral shapes (cross-sectional shapes) of the tapered portion 320 and the small diameter portion 322 do not have similar shapes with respect to the outer peripheral shape (cross-sectional shape) of the insertion portion body 316. It suffices as long as the tapered portion 320 has a tapered shape that becomes slenderer away from the insertion portion body 316. Further, it suffices as long as the small diameter portion 322 has a shape whose outer peripheral shape is smaller than that of the insertion portion body 316 and where the entire outer peripheral portion of the small diameter portion 322 is spaced apart from the inner peripheral portion of the attachment hole 54 in a state where the insertion portion body 316 has been inserted into the attachment hole 54.

Figure 30:
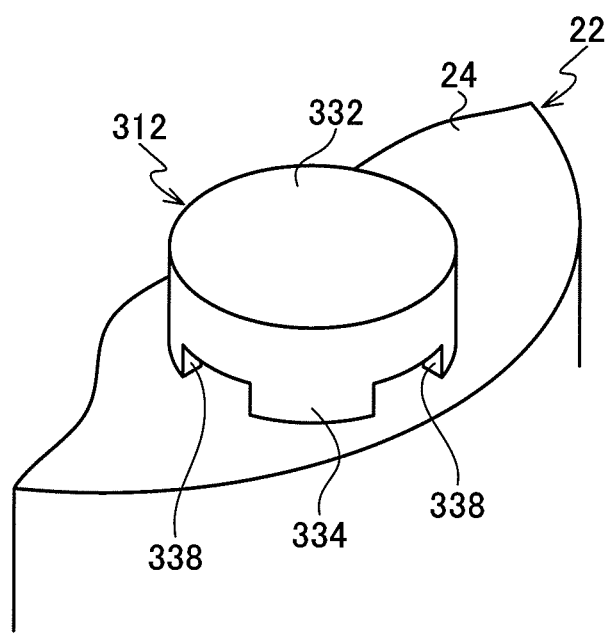
FIG. 30 is an enlarged perspective view showing a state where the plug is attached.

As shown in FIG. 26 and FIG. 29, a head portion 332 serving as a filter unit is formed on the side of the insertion portion body 316 opposite the tapered portion 320 side. The head portion 332 is formed in a disc shape whose outer diameter dimension is larger than the inner diameter dimension of the attachment hole 54 and a circular cylinder shape whose axial direction dimension is relatively short. The head portion 332 is concentric with the insertion portion body 316. As shown in FIG. 27 and FIG. 30, in a state where the insertion portion body 316 has been inserted into the attachment hole 54, the head portion 332 coaxially covers the attachment hole 54, and the open end of the attachment hole 54 in the piston body 24 is entirely hidden under the head portion 332.

In this way, the head portion 332 cannot be inserted into the attachment hole 54, so when the insertion portion body 316 is inserted into the attachment hole 54, the head portion 332 comes into contact with the end surface of the piston body 24 in the range of the open end of the attachment hole 54. For that reason, the insertion portion body 316 does not become inserted too much into the attachment hole 54 (that is, the head portion 332 has the function of a stopper when inserting the insertion portion body 316 into the attachment hole 54).

In the present embodiment, the outer peripheral shape of the head portion 332 is circular, but it is alright if the outer peripheral shape of the head portion 332 is not circular as long as the outer peripheral shape of the head portion 332 is larger than the inner peripheral shape of the attachment hole 54 and the open end of the attachment hole 54 is entirely hidden under the head portion 332 in a state where the insertion portion body 316 has been inserted into the attachment hole 54.

Further, as shown in FIG. 26 and FIG. 29, a peripheral wall 334 is formed on the head portion 332. The peripheral wall 334 is formed in an annular shape whose outer diameter dimension is equal to the outer diameter dimension of the head portion 332, and the peripheral wall 334 is formed coaxially with respect to the head portion 332 from the end surface of the head portion 332 on the insertion portion body 316 side. The inner diameter dimension of the peripheral wall 334 is longer than the length of the diagonal lines of the cross section of the insertion portion body 316. For this reason, as shown in FIG. 29, an annular communicative portion 336 continuing in the inner peripheral direction of the peripheral wall 334 is formed between the inner peripheral portion of the peripheral wall 334 and the outer peripheral portion of the insertion portion body 316. Further, plural cutout portions 338 are formed in the peripheral wall 334. The cutout portions 338 open at the end portion of the peripheral wall 334 on the side opposite the head portion 332 side and also open at the inner peripheral surface and the outer peripheral surface of the peripheral wall 334. The open dimension of each of the cutout portions 338 along the circumferential direction of the head portion 332 in the outer peripheral surface of the peripheral wall 334 is set to about 1.4 mm, and the open dimension of each of the cutout portions 338 along the axial direction of the head portion 332 is set to about 0.4 mm.

The cutout portions 338 are formed in such a way as to oppose the sides of the rectangle that is the cross-sectional shape of the insertion portion body 316. The cutout portions 338 lead to the gaps 318 between the outer peripheral portion of the insertion portion body 316 and the inner peripheral portion of the attachment hole 54 via the annular communicative portion 336 and further lead to the gas flow rate adjusting hole 60 via the gaps 318.

For this reason, even when the head portion 332 comes into contact with the end surface of the piston body 24 in the range of the open end of the attachment hole 54 as a result of the insertion portion body 316 being inserted into the attachment hole 54, the gaps 318 and the portion of the piston body 24 on the side opposite the rack bar 30 side in the space on the inner side of the cylinder 12 become communicated with each other via the cutout portions 338 that open at the outer peripheral surface of the peripheral wall 334 and the annular communicative portion 336.

In the present embodiment, the diameter dimension of the inner peripheral portion of the gas flow rate adjusting hole 60 is set to about 0.5 mm and specifically from 0.4 mm to 0.6 mm.

That is, in the present embodiment, the open dimension of each of the cutout portions 338 along the circumferential direction of the head portion 332 is set larger than the diameter dimension of the inner peripheral portion of the gas flow rate adjusting hole 60, and the open dimension of each of the cutout portions 338 along the axial direction of the head portion 332 is set smaller than the diameter dimension of the inner peripheral portion of the gas flow rate adjusting hole 60. Moreover, when the open shapes of the individual cutout portions 338 and the open shape of the gas flow rate adjusting hole 60 are seen superimposed, they are offset from and do not coincide with each other in a plan view. Further, the sum total of the open areas of all of the cutout portions 338 on the outer peripheral surface side of the peripheral wall 334 is larger than the open area of the gas flow rate adjusting hole 60.

In relation to the individual open shapes of the cutout portions 338, for example, if the shapes of the cinders 56 are already known, it is preferred that the individual open shapes of the cutout portions 338 be set smaller than the smallest width dimension of the cinders 56 when the cinders 56 are seen from various directions. Further, if the shapes of the cinders 56 are unclear, it is preferred that the individual open shapes of the cutout portions 338 be set smaller than the smallest width dimension of the agent before combustion when the agent before combustion is seen from various directions.

Action and Effects of Fourth Embodiment

In the embodiment with the configurations described above, when the gas generator 20 is actuated, the gas is produced by the gas generator 20 and the agent such as a gas-generating agent is combusted, and the cinders 56 of the agent are released into the inside of the cylinder 12 together with the gas. Here, the individual open shapes of the gaps 318 formed between the inner peripheral surface of the attachment hole 54 and the outer peripheral surface of the insertion portion body 316 excluding the corner portions are set smaller than the open shape of the gas flow rate adjusting hole 60, but the sum total of the open areas of all of the gaps 318 is larger than the open area of the gas flow rate adjusting hole 60. Moreover, the sum total of the open areas of all of the cutout portions 338 on the outer peripheral side of the peripheral wall 334 is larger than the open area of the gas flow rate adjusting hole 60.

Moreover, the gaps 318 and the cutout portions 338 are formed in four places in the range of the insertion portion body 316 and, particularly in the present embodiment, every 90 degrees centered on the axial direction of the insertion portion 316. For this reason, even if any of the gaps 318 or cutout portions 338 become blocked by the cinders 56, any of the other gaps 318 or cutout portions 338 do not become blocked by the cinders 56. For this reason, even if the cinders 56 block any of the gaps 318 or cutout portions 338, the difference between the sum total of the open areas of the gaps 318 or cutout portions 338 not blocked by the cinders 56 and the open area of the gas flow rate adjusting hole 60 becomes smaller, but the gas with the flow rate decided by the open area of the gas flow rate adjusting hole 60 can be released.

That is, in the present embodiment also, basically effects that are the same as those in each of the embodiments heretofore described can be obtained.

Moreover, the distal end side of the plug 312 fitted into the attachment hole 54 is the small diameter portion 322, and the length of the diagonal lines of the small diameter portion 322 is shorter than the diameter dimension of the inner peripheral portion of the attachment hole 54. For this reason, when the plug 312 is fitted into the attachment hole 54, the small diameter portion 322 can be simply inserted into the attachment hole 54. After the small diameter portion 322 is inserted into the attachment hole 54 in this way, next the tapered portion 320 is inserted into the attachment hole 54, but the lengths of the diagonal lines of the tapered portion 320 gradually become longer toward the insertion portion body 316 side.

For this reason, the tapered portion 320 is inserted into the inside of the attachment hole 54 while the corner portions of the tapered portion 320 interfere with the inner peripheral portion of the attachment hole 54, whereby eventually the central axis of the insertion portion body 316 and the central axis of the attachment hole 54 can be aligned and the insertion portion body 316 can be easily fitted into the attachment hole 54. When the insertion portion body 316 is fitted into the attachment hole 54 in this way, the corner portions of the insertion portion body 316 press against the inner peripheral portion of the attachment hole 54, so the plug 312 can be held in the piston body 24 by the friction between the inner peripheral portion of the attachment hole 54 and the corner portions of the insertion portion body 316 without having to use special fixing means or holding means.

In the present embodiment, the gaps 318 formed between the inner peripheral surface of the attachment hole 54 and the outer peripheral surface of the insertion portion body 316 excluding the corner portions are used as the vent portions. However, the cutout portions 338 may be used as the vent portions by the open dimension of each of the cutout portions 338 along the circumferential direction of the head portion 332 in the outer peripheral surface of the peripheral wall 334 and the open dimension of each of the cutout portions 338 along the axial direction of the head portion 332 may also be appropriately set.

What is claimed is:

1. A pretensioner comprising:
   a gas generating unit which, when actuated, causes an agent to combust to thereby generate a gas;
   a pretensioner body to which the gas generating unit is attached and to whose inside the gas that has been generated by the gas generating unit is supplied;
   a spool driving member that is disposed inside the pretensioner body, is caused to move by the pressure of the gas that has been supplied to the inside of the pretensioner body, and by this movement causes a spool to rotate to thereby cause webbing to be retracted onto the spool;
   a gas flow rate adjusting portion that is disposed in the spool driving member, a gas passage direction downstream side of the gas flow rate adjusting portion communicating with an opposite side of a gas generating unit side with respect to the spool driving member, and whose inner peripheral shape is set in accordance with a flow rate of the gas to be passed through the gas flow rate adjusting portion; and
   a filter unit that has, or forms, a vent portion that is communicated with a space between the gas generating unit and the spool driving member and is also communicated with the gas flow rate adjusting portion,
   wherein
   an open shape of the gas flow rate adjusting portion and an open shape of the vent portion are set in such a way that the open shape of the gas flow rate adjusting portion has a portion that does not coincide in a plan view with the open shape of the vent portion, and
   the overall open area of the vent portion is set larger than the open area of the gas flow rate adjusting portion, and
   wherein the vent portion is formed with the filter unit and the spool driving member such that the vent portion has a constant volume, and the vent portion is in communication with an outside of the pretensioner body prior to actuation of the spool driving member.

2. The pretensioner according to claim 1, wherein a setting range of the vent portion is set larger than a setting range of the gas flow rate adjusting portion.

3. The pretensioner according to claim 1, wherein
   a plurality of the vent portion are disposed,
   the respective open areas of the vent portions are set smaller than the open area of the gas flow rate adjusting portion, and
   a sum total of the open areas of all of the vent portions is set larger than the open area of the gas flow rate adjusting portion.

4. The pretensioner according to claim 1, further comprising an attachment hole that is formed in the spool driving member on a gas passage direction upstream side of the gas flow rate adjusting portion, with the attachment hole having an end portion on the gas passage direction upstream side that opens larger than the open area of the gas flow rate adjusting portion and an end portion on the gas passage direction downstream side that is communicated with the gas flow rate adjusting portion,
   wherein
   the filter unit is attached to the attachment hole in such a way as to be inscribed in an inner peripheral portion of the attachment hole, and
   the vent portion that opens at both gas passage direction end portions of the filter unit attached to the attachment hole is formed in the filter unit.

5. The pretensioner according to claim 1, further comprising an attachment hole that is formed in the spool driving member on a gas passage direction upstream side of the gas flow rate adjusting portion, with the attachment hole having an end portion on the gas passage direction upstream side that opens larger than the open area of the gas flow rate adjusting portion and an end portion on the gas passage direction downstream side that is communicated with the gas flow rate adjusting portion, wherein
the filter unit is attached to the attachment hole in such a way as to be inscribed in an inner peripheral portion of the attachment hole,
an outer peripheral shape of the filter unit is capable of being inscribed in the inner peripheral portion of the attachment hole and differs from an inner peripheral shape of the attachment hole, and
a gap formed between the inner peripheral portion of the attachment hole and an outer periphery of the filter unit is used as the vent portion.

6. The pretensioner according to claim 1, further comprising
an attachment hole that is formed in the spool driving member on a gas passage direction upstream side of the gas flow rate adjusting portion, with the attachment hole having an end portion on the gas passage direction upstream side that opens larger than the open area of the gas flow rate adjusting portion and an end portion on the gas passage direction downstream side that is communicated with the gas flow rate adjusting portion, wherein
a plug whose outer peripheral shape is formed in a shape differing from an inner peripheral shape of the attachment hole and which is inserted into and held in the attachment hole is used as the filter unit, and the plug has
an insertion portion where at least part of a gap formed between an outer peripheral portion of the insertion portion and an inner peripheral portion of the attachment hole is communicated with the gas flow rate adjusting portion and
a head portion that is positioned on the gas generating unit side of the spool driving member in a state where the insertion portion has been inserted into the attachment hole, with an opening formed in an outer peripheral surface of the head portion being communicated with the gap between the inner peripheral portion of the attachment hole and the outer peripheral portion of the insertion portion.

7. The pretensioner according to claim 6, wherein the plug includes
an insertion portion body, part of whose outer periphery contacts the inner peripheral portion of the attachment hole in a state where the insertion portion body has been inserted into the attachment hole, and
a small diameter portion whose outer peripheral shape is formed slenderer than that of the insertion portion body on the side of the insertion portion body opposite the head portion side.

8. The pretensioner according to claim 1, wherein
the filter unit is disposed on the gas generating unit side with respect to an end portion of the spool driving member,
the gas flow rate adjusting portion is communicated with a space between the end portion of the spool driving member on the gas generating units side and the filter unit, and
the vent portion is formed in the filter unit.

9. The pretensioner according to claim 1, wherein
the filter unit is disposed on the gas generating unit side with respect to an end portion of the spool driving member,
a gap between an outer peripheral portion of the end portion of the spool driving member on the gas generating unit side and an outer peripheral portion of the filter unit is used as the vent portion, and
the gas flow rate adjusting portion is communicated with a space between the end portion of the spool driving member on the gas generating units side and the filter unit.

10. The pretensioner according to claim 1, wherein
disposed in the spool driving member are
a driving member body whose outer peripheral shape is smaller than the inner peripheral shape of the pretensioner body,
an annular member that is attached to the driving member body in such a way as to surround an outer peripheral portion of the driving member body and whose inner peripheral portion contacts the outer peripheral portion of the driving member body in a state where the annular member has been attached to the driving member body,
a groove portion that is formed in the outer peripheral portion of the driving member body, opens at an end portion of the driving member body on the gas generating units side and the outer peripheral portion of the driving member body, is communicated with the gas flow rate adjusting portion, and is spaced apart from the inner peripheral portion of the annular member in a state where the annular member has been attached to the driving member body is used as the vent portion, and
the driving member body and the annular member are used as the filter unit.

11. The pretensioner according to claim 1, wherein the spool driving member includes a piston that moves along an axis, and the gas flow rate adjusting portion extends axially completely through the piston of the spool driving member.

* * * * *